(12) United States Patent
Wang et al.

(10) Patent No.: US 11,516,811 B2
(45) Date of Patent: Nov. 29, 2022

(54) CONTROL INFORMATION TRANSMISSION METHOD AND DEVICE

(71) Applicant: HUAWEI TECHNOLOGIES CO., LTD., Guangdong (CN)

(72) Inventors: Ting Wang, Shanghai (CN); Shengyue Dou, Shanghai (CN); Yuanjie Li, Shanghai (CN); Hao Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 306 days.

(21) Appl. No.: 16/714,361

(22) Filed: Dec. 13, 2019

(65) Prior Publication Data

US 2020/0120679 A1     Apr. 16, 2020

Related U.S. Application Data

(63) Continuation of application No. PCT/CN2018/091351, filed on Jun. 14, 2018.

(30) Foreign Application Priority Data

Jun. 15, 2017 (CN) .......................... 201710452223.5

(51) Int. Cl.
*H04W 72/04* (2009.01)
*H04W 76/11* (2018.01)

(52) U.S. Cl.
CPC ..... *H04W 72/0486* (2013.01); *H04W 72/042* (2013.01); *H04W 72/0453* (2013.01); *H04W 76/11* (2018.02)

(58) Field of Classification Search
None
See application file for complete search history.

(56) References Cited

U.S. PATENT DOCUMENTS 10,743,239 B2 * 8/2020 Wang .................. H04W 72/042
2013/0153298 A1   6/2013 Pietraski et al.
(Continued)

FOREIGN PATENT DOCUMENTS

CN    101646244 A    2/2010
CN    106714322 A    5/2017
(Continued)

OTHER PUBLICATIONS

Research in Motion et al., "Discussion On Remaining Issues for EPDCCH",3GPP Draft; R1-125065, XP0506629363 Nov. 3, 2012, 4 pages.
(Continued)

*Primary Examiner* — Saba Tsegaye
(74) *Attorney, Agent, or Firm* — Fish & Richardson P.C.

(57) ABSTRACT

This application provides a control information transmission method and a device. The method includes: sending, by a first network device, configuration information to a terminal device, where the configuration information is used to instruct the terminal device to detect first control information on a first carrier and detect second control information on a second carrier, and both the first control information and the second control information are control information for scheduling data on the second carrier; and sending, by the first network device, at least one of the first control information and the second control information.

20 Claims, 8 Drawing Sheets

(56) References Cited

U.S. PATENT DOCUMENTS

| | | | |
|---|---|---|---|
| 2015/0124724 | A1 | 5/2015 | Yang et al. |
| 2016/0295600 | A1* | 10/2016 | Dinan ................. H04W 72/121 |
| 2016/0353432 | A1* | 12/2016 | Xu .................... H04W 72/0413 |
| 2017/0325156 | A1 | 11/2017 | Wang et al. |
| 2018/0049206 | A1* | 2/2018 | Yerramalli ............ H04W 52/38 |
| 2018/0131482 | A1 | 5/2018 | Zhou et al. |
| 2020/0107299 | A1* | 4/2020 | Zhou .................. H04W 56/005 |
| 2020/0136790 | A1* | 4/2020 | Takeda ................. H04W 88/06 |

FOREIGN PATENT DOCUMENTS

| | | |
|---|---|---|
| CN | 106793145 A | 5/2017 |
| EP | 3128801 A1 | 2/2017 |
| WO | 2016106576 A1 | 7/2016 |

OTHER PUBLICATIONS

Intel Corporation, "Scheduling aspects for carrier aggregation",3GPP Draft; R1-1707416, XP051272625, May 14, 2017, 4 pages.
Extended European Search Report issued in European Application No. 18817569.9 dated Apr. 14, 2020, 11 pages.
Huawei et al., "WF on Coordinated Transmission Scheme", 3GPP TSG RAN WG1 NR Ad Hoc Meeting ,R1-1701511, revised R1-1701337, Spokane, USA, Jan. 16-20, 2017, 3 pages.
PCT International Search Report and Written Opinion in International Application No. PCT/CN2018/091,351, dated Aug. 20, 2018, 17 pages (With English Translation).
Office Action in Indian Application No. 201937054260, dated Feb. 11, 2021, 6 pages.
Office Action issued in Chinese Application No. 201710452223.5 dated Apr. 20, 2021, 6 pages.

\* cited by examiner

CONTROL INFORMATION TRANSMISSION METHOD AND DEVICE

CROSS-REFERENCE TO RELATED APPLICATIONS

This application is a continuation of International Application No. PCT/CN2018/091351, filed on Jun. 14, 2018, which claims priority to Chinese Patent Application No. 201710452223.5, filed on Jun. 15, 2017, The disclosures of the aforementioned applications are hereby incorporated by reference in their entireties.

TECHNICAL FIELD

This application relates to the communications field, and more specifically, to a control information transmission method and a device.

BACKGROUND

A coordinated multipoint transmission/reception (Coordinated Multiple Points Transmission/Reception, CoMP) technology is intended to implement coordinated transmission between transmission points at different geographical locations. A current mainstream CoMP technology may be implemented as a joint processing (Joint Processing, JP) technology and a coordinated scheduling/coordinated beamforming (Coordinated Scheduling/Beamforming, CS/CB) technology.

The JP technology may be classified into a joint transmission (Joint Transmission, JT) technology and dynamic point selection (Dynamic Point Selec, DPS). In a JT transmission mode, a plurality of transmission points send data to a same terminal device on a same carrier, to improve communication performance of a cell user.

In the JT transmission mode, at least two transmission points (Transfer point, TRP) separately send control information to the terminal device through control channels. The terminal device simultaneously receives, on the same carrier, the control information sent by the at least two transmission points. Because the plurality of pieces of control information are sent by using the same carrier, a resource conflict exists. Consequently, the terminal device cannot accurately obtain control information sent by each transmission point, thereby affecting network performance.

SUMMARY

This application provides a control information transmission method, so that a terminal device can accurately obtain each piece of control information.

According to a first aspect, a control information transmission method is provided, including:

sending, by a first network device, configuration information to a terminal device, where the configuration information is used to instruct the terminal device to detect first control information on a first carrier and detect second control information on a second carrier, and both the first control information and the second control information are control information for scheduling data on the second carrier; and sending, by the first network device, at least one of the first control information and the second control information.

Therefore, in this embodiment of this application, the network device sends the configuration information, and for data scheduling on one carrier, the terminal device detects both a cross-carrier scheduling cell and a same-carrier scheduling cell. In this way, a prior-art problem that only control information on the data scheduling carrier is detected is resolved, and a conflict between resources for a plurality of pieces of control information of a same terminal device is avoided, so that the terminal device can accurately obtain control information sent by each transmission point, thereby improving network performance.

It should be understood that in this specification, for ease of description, that only the first network device sends the configuration information is described in step 210. However, this embodiment of this application is not limited thereto. For example, a network device sending the configuration information may be either of the first network device and a second network device that perform joint transmission, for example, the second network device sends the configuration information.

Further, optionally, the network device sending the configuration information may be the same as or different from a network device sending control information. For example, a device other than the first network device and the second network device sends the configuration information. For example, a third network device sends the configuration information, and the first network device or the second network device sends the control information. This is not specifically limited herein.

Optionally, in this embodiment of this application, the configuration information may not be sent. In this case, the terminal device does not need an indication from the network device, and for scheduled data on a carrier, the terminal device may detect control information on a plurality of carriers based on a preset system configuration.

For example, the terminal device may determine, based on a current transmission mode, to detect scheduling information of a same carrier on the plurality of carriers. For example, the transmission mode includes a single cell transmission mode or a coordinated transmission mode. Alternatively, the terminal device determines, based on carrier configuration information, to detect scheduling information on the plurality of carriers. For example, the terminal device configures only two, three, or more carriers, and the terminal device may detect scheduling information on the two, three, or more carriers based on a preset configuration.

Correspondingly, after receiving the configuration information, the terminal device detects both control information (namely, the first control information) on the first carrier and control information (namely, the second control information) on the second carrier for scheduled data on the second carrier according to an indication of the obtained configuration information (or based on the preset system configuration).

Therefore, in this embodiment of this application, the network device sends the configuration information, and for data scheduling on one carrier, the terminal device detects both a cross-carrier scheduling cell and a same-carrier scheduling cell. In this way, a prior-art problem that only control information on the data scheduling carrier is detected is resolved, and a conflict between resources for a plurality of pieces of control information of a same terminal device is avoided, so that the terminal device can accurately obtain control information sent by each transmission point, thereby improving network performance.

In another case, the first network device sends the first control information and the second control information. For example, in a coordinated scenario, the first network device may obtain scheduling information of the second network device, so that the first network device sends scheduling information of the first network device and the scheduling information of the second network device. In addition, when control channel resources on the second carrier are limited, the first network device may send the first control information on the first carrier, and send the second control information on the second carrier.

Therefore, in this embodiment of this application, the first network device sends the two pieces of control information, and the second network device does not need to send control information, so that signaling overheads of the second network device can be reduced, resource pressure of the second carrier can be reduced, and network performance can be improved.

It should be understood that, in this embodiment of this application, a carrier may be in a one-to-one correspondence with a cell. For example, a cell 1 corresponds to a carrier 1, and a cell 2 corresponds to a carrier 2. Alternatively, one carrier may correspond to a plurality of cells. For example, a carrier 1 corresponds to a cell 1, and the carrier 1 also corresponds to a cell 2. Alternatively, a plurality of carriers may correspond to one cell. For example, a carrier 1 corresponds to a cell 1, and a carrier 2 also corresponds to the cell 1.

Optionally, a carrier in this embodiment of this application may alternatively correspond to a segment of frequency domain resources, for example, one carrier may include one or more bandwidth parts. The carrier in this embodiment of this application may be a bandwidth part.

Optionally, the carrier in this embodiment of this application may be alternatively a component carrier (Component Carrier, CC) in carrier aggregation. This embodiment of this application is not limited thereto.

In one case, the first network device sends the first control information and the second control information. For example, in a non-joint transmission scenario, for a single-scheduling scenario of the first network device, the first network device may send two pieces of control information of a same carrier (the second carrier) by using two carriers (the first carrier and the second carrier), namely, the first control information and the second control information.

For example, the first control information may be control information for scheduled data that is retransmitted on the second carrier, and the second control information may be control information for scheduled data that is newly transmitted on the second carrier.

Correspondingly, after receiving the configuration information, the terminal device detects both control information (namely, the first control information) on the first carrier and control information (namely, the second control information) on the second carrier for the scheduled data on the second carrier according to an indication of the configuration information.

In an existing solution, the network device first sends the control information of the retransmitted data, and then sends the control information of the newly transmitted data. However, in this embodiment of this application, the control information of the retransmitted data and the control information of the newly transmitted data are separately sent on the two carriers at a same scheduling moment, so that the terminal device can simultaneously obtain a plurality of pieces of control information. In this way, a disadvantage of transmitting control information in a single transmission method in the existing solution is overcome, communication efficiency can be increased, and network performance can be improved.

It should be understood that, in this embodiment of this application, the same scheduling moment may be a same scheduling moment unit such as a same subframe, a same slot, or a same mini-slot.

In this embodiment of this application, optionally, the configuration information or the preset system configuration is used to instruct the terminal device to separately detect control information on the first carder and the second carrier. However, during actual transmission, the first network device or the second network device may alternatively not send the control information. That is, even though the configuration information or the preset system configuration is used to instruct the terminal device to detect the first control information and the second control information, the terminal device may actually detect the first control information and the second control information, or the terminal device may detect only the first control information, or the terminal device may detect only the second control information, or the terminal device may detect neither the first control information nor the second control information. This is not specifically limited herein.

For example, in a non-ideal backhaul scenario, there is a latency in interaction between network devices. Therefore, a network device may determine a carrier on which the network device sends control information. For example, the first network device sends the control information on the first carrier, and the second network device sends the control information on the second carrier. In this way, a conflict between resources on which control information sent by a plurality of network devices are located can be avoided. However, during actual scheduling, at a scheduling moment, the first network device may send the control information, or the second network device may send the control information, or both the first network device and the second network device may send the control information. The actual scheduling situation is specifically subject to current scheduling performed by a network device. This is not specifically limited herein.

Optionally, in an implementation of the first aspect, the configuration information includes first identifier information and second identifier information, the first identifier information is used to indicate the first carrier, and the second identifier information is used to indicate the second carrier.

For example, the first identifier information includes an identity ID of the first carder or an ID of a first cell corresponding to the first carrier, and the second identifier information includes an ID of the second carrier or an ID of a second cell corresponding to the second carrier.

Optionally, in another embodiment, the configuration information may include same-carrier scheduling information and cross-carrier scheduling information.

For example, the same-carrier scheduling information is used to indicate that scheduling information of data on a carrier is sent on a control channel of the carrier, and the cross-carrier scheduling information is used to indicate that scheduling information of data on a carrier is sent on control information of another carrier.

For example, it is assumed that there are two carriers: the first carrier and the second carrier, both the first network device and the second network device schedule data on the second carrier, the first network device performs cross-carrier scheduling, and the second network device performs same-carrier scheduling. In this case, scheduling information of data on the second carrier corresponding to the first network device is sent by using the first carrier, and scheduling information of data on the second carrier corresponding to the second network device is sent by using the second carrier.

In this embodiment of this application, the configuration information can indicate that the terminal device needs to detect control information of a plurality of carriers for data scheduling on one carrier. For example, for data scheduling on the second carrier, the terminal device needs to detect control information that is for data scheduling on the second carrier and that is sent by using the first carrier and the second carrier. In other words, the configuration information may be used to configure the second carrier of the terminal device to an enhanced cross-carrier scheduling state. That is, for the second carrier, the terminal device needs to perform PDCCH detection (that is, detect the first control information sent on the first carrier) of cross-carrier scheduling, and also needs to perform PDCCH detection (that is, detect the second control information sent on the second carrier) of same-carrier scheduling.

Optionally, in an implementation of the first aspect, the sending, by the first network device, at least one of the first control information and the second control information includes:

determining, by the first network device based on a traffic volume on the first carrier or the second carrier, to send the first control information on the first carrier; or determining, by the first network device based on a traffic volume on the first carrier or the second carrier, to send the second control information on the second carrier.

In one case, the first network device sends the first control information or the second control information. For example, in a joint transmission scenario, the first network device may send the first control information, and the second network device sends the second control information; or the first network device sends the second control information, and the second network device sends the first control information.

It should be understood that, that only the first network device sends the configuration information is described above. However, this embodiment of this application is not limited thereto. For example, a network device sending the configuration information may be either of the first network device and the second network device that perform joint transmission, for example, the second network device sends the configuration information.

Further, optionally, the network device sending the configuration information may be the same as or different from a network device sending control information. For example, a device other than the first network device and the second network device sends the configuration information. For example, a third network device sends the configuration information, and the first network device or the second network device sends the control information. This is not specifically limited herein.

Optionally, in this embodiment of this application, the configuration information may not be sent. In this case, the terminal device does not need an indication from the network device, and for scheduled data on a carrier, the terminal device may detect control information on a plurality of carriers based on a preset system configuration.

For example, the terminal device may determine, based on a current transmission mode, to detect scheduling information of a same carrier on the plurality of carriers. For example, the transmission mode includes a single cell transmission mode or a coordinated transmission mode. Alternatively, the terminal device determines, based on carrier configuration information, to detect scheduling information on the plurality of carriers. For example, the terminal device configures only two, three, or more carriers, and the terminal device may detect scheduling information on the two, three, or more carriers based on a preset configuration.

Optionally, in an implementation of the first aspect, the determining, by the first network device based on a traffic volume on the first carrier or the second carrier, to send the first control information on the first carrier includes:

sending, by the first network device, the first control information on the first carrier when a traffic volume of the first network device on the second carrier is greater than a preset traffic volume threshold; and when the first network device determines to send the first control information on the first carrier, the method further includes:

sending, by the first network device, first scheduling indication information to the second network device, where the first scheduling indication information is used to instruct the second network device to send the second control information by using the second carrier.

Optionally, the first network device sends the first control information on the first carrier when a traffic volume of the first network device on the first carrier is less than a preset traffic volume threshold.

Optionally, the first network device sends the first control information on the first carrier when a traffic volume of the first network device on the first carrier is less than a traffic volume of the first network device on the second carrier.

The determining, by the first network device based on a traffic volume on the first carrier or the second carrier, to send the second control information on the second carrier includes:

sending, by the first network device, the second control information on the second carrier when a traffic volume of the first network device on the first carrier is greater than a preset traffic volume threshold; and when the first network device determines to send the first control information on the first carrier, the method further includes:

sending, by the first network device, second scheduling indication information to the second network device, where the second scheduling indication information is used to instruct the second network device to send the first control information by using the first carrier.

Optionally, the first network device sends the first control information on the first carrier when a traffic volume of the first network device on the second carrier is less than a preset traffic volume threshold.

Optionally, the first network device sends the second control information on the second carrier when a traffic volume of the first network device on the second carrier is less than a traffic volume of the first network device on the first carrier.

Optionally, in an implementation of the first aspect, the sending, by the first network device, at least one of the first control information and the second control information includes:

determining, by the first network device according to third scheduling indication information sent by the second network device, to send the first control information on the first carrier, where the third scheduling indication information is used to instruct the first network device to send the first control information by using the first carrier or the third scheduling indication information is used to instruct the second network device to send the second control information by using the second carrier; or sending, by the first network device, the second control information on the second carrier according to fourth scheduling indication information sent by the second network device, where the fourth scheduling indication information is used to instruct the first network device to send the second control information by using the second carrier or the fourth scheduling indication information is used to instruct the second network device to send the first control information by using the first carrier.

Alternatively, the third scheduling indication information is used to instruct the first network device to send the second control information on the second carrier. After the second network device receives the third scheduling indication information, it may be learned that the first network device sends the second control information on the second carrier, and it may be further learned that the second network device needs to send the first control information by using the first carrier.

Further, optionally, the second network device may feed back, to the first network device, a message about whether the second network device may send the first control information on the first carrier. In other words, the first network device and the second network device may negotiate about specific carriers on which the first network device and the second network device transmit the control information.

Optionally, in an implementation of the first aspect, the sending, by the first network device, at least one of the first control information and the second control information includes:

determining, by the first network device based on a cell type of the first network device, to send the first control information on the first carrier or send the second control information on the second carrier, where the cell type is a serving cell or a coordinated cell.

For example, a predefined manner is that same-carrier scheduling is performed for the serving cell and cross-carrier scheduling is performed for the coordinated cell. Assuming that the first network device corresponds to the serving cell, and the second network device corresponds to the coordinated cell, the first network device performs same-carrier scheduling for data scheduling on the second carrier based on the predefined manner. Therefore, the first network device sends the second control information by using the second carrier, the second network device performs cross-carrier scheduling, and the second network device sends the first control information by using the first carrier.

Alternatively, a predefined manner is that cross-carrier scheduling is performed for the serving cell and same-carrier scheduling is performed for the coordinated cell. Assuming that the first network device corresponds to the serving cell, and the second network device corresponds to the coordinated cell, the first network device performs cross-carrier scheduling for data scheduling on the second carrier based on the predefined manner. Therefore, the first network device sends the first control information by using the first carrier, the second network device performs same-carrier scheduling, and the second network device sends the second control information by using the second carrier.

Alternatively, another predefined manner is used. This is not limited herein.

Further, optionally, a network device sending the configuration information may be the same as or different from a network device sending control information. For example, a third network device sends the configuration information, and the first network device or the second network device sends the control information. This is not specifically limited herein.

Optionally, in an implementation of the first aspect, the sending, by the first network device, at least one of the first control information and the second control information includes:

determining, by the first network device based on a value relationship between a cell identity of the first network device and a cell identity of the second network device, to send the first control information on the first carrier or send the second control information on the second carrier.

For example, a predefined manner is that same-carrier scheduling is performed for a cell having a larger cell identity and cross-carrier scheduling is performed for a cell having a smaller cell identity. Assuming that the cell identity corresponding to the first network device is greater than the cell identity corresponding to the second network device, the first network device performs same-carrier scheduling for scheduling on the second carrier based on the predefined manner. Therefore, the first network device sends the second control information by using the second carrier, the second network device performs cross-carrier scheduling, and the second network device sends the first control information by using the first carrier.

A predefined manner is that same-carrier scheduling is performed for a cell having a smaller cell identity and cross-carrier scheduling is performed for a cell having a larger cell identity. Assuming that the cell identity corresponding to the first network device is greater than the cell identity corresponding to the second network device, the second network device performs same-carrier scheduling for scheduling on the second carrier based on the predefined manner. Therefore, the first network device sends the second control information by using the second carrier, the first network device performs cross-carrier scheduling, and the second network device sends the first control information by using the first carrier.

Further, optionally, a network device sending the configuration information may be the same as or different from a network device sending control information. For example, a device other than the first network device and the second network device sends the configuration information. For example, a third network device sends the configuration information, and the first network device or the second network device sends the control information. This is not specifically limited herein.

Optionally, in an implementation of the first aspect, the method further includes: sending, by the first network device, cell indication information to the terminal device, where the cell indication information is used to indicate at least one of the following information: cell identity information separately corresponding to the first control information and the second control information, path loss identifier information separately corresponding to the first control information and the second control information, beam reference signal identifier information separately corresponding to the first control information and the second control information, synchronization signal identifier information separately corresponding to the first control information and the second control information, mobility reference signal identifiers separately corresponding to the first control information and the second control information, and quasi co-location indication information separately corresponding to the first control information and the second control information.

Optionally, in an implementation of the first aspect, when the first network device sends the first control information on the first carrier, the second control information is sent by the second network device by using the second carrier; or when the first network device sends the second control information on the second carrier, the second control information is sent by the first network device by using the second carrier.

Therefore, in this embodiment of this application, the network device sends the configuration information, and for data scheduling on one carrier, the terminal device detects both a cross-carrier scheduling cell and a same-carrier scheduling cell. In this way, a prior-art problem that only control information on the data scheduling carrier is detected is resolved, and a conflict between resources for a plurality of pieces of control information of a same terminal device is avoided, so that the terminal device can accurately obtain control information sent by each transmission point, thereby improving network performance.

According to a second aspect, a control information transmission method is provided, including: receiving, by a terminal device, configuration information sent by a first network device, where the configuration information is used to instruct the terminal device to detect first control information on a first carrier and detect second control information on a second carrier, and both the first control information and the second control information are control information for scheduling data on the second carrier; and detecting, by the terminal device, the first control information on the first carrier, and detecting the second control information on the second carrier.

Therefore, in this embodiment of this application, the network device sends the configuration information, and for data scheduling on one carrier, the terminal device detects both a cross-carrier scheduling cell and a same-carrier scheduling cell. In this way, a prior-art problem that only control information on the data scheduling carrier is detected is resolved, and a conflict between resources for a plurality of pieces of control information of a same terminal device is avoided, so that the terminal device can accurately obtain control information sent by each transmission point, thereby improving network performance.

It should be understood that the second aspect corresponds to the first aspect, the first aspect is executed by the first network device, and the second aspect is executed by the terminal device. For corresponding features of the method on the terminal device side, refer to the corresponding descriptions on the first network device side in the first aspect. Therefore, for brevity, detailed descriptions are properly omitted.

Optionally, in an implementation of the second aspect, the configuration information includes first identifier information and second identifier information, the first identifier information is used to indicate the first carrier, and the second identifier information is used to indicate the second carrier.

Optionally, in an implementation of the second aspect, the method further includes:

determining, by the terminal device, a correspondence between a network device and control information, where the correspondence includes that the first network device corresponds to the first control information carried on the first carrier, and that the second network device corresponds to the second control information carried on the second carrier; or the correspondence includes that the first network device corresponds to the second control information carried on the second carrier, and that the second network device corresponds to the first control information carried on the first carrier.

Optionally, in an implementation of the second aspect, the determining, by the terminal device, a correspondence between a network device and control information includes:

determining, by the terminal device, the correspondence based on a cell type of the first network device and a cell type of the second network device, where the cell type includes a serving cell or a coordinated cell.

Optionally, in an implementation of the second aspect, the determining, by the terminal device, a correspondence between a network device and control information includes:

determining, by the terminal device, the correspondence based on a value relationship between a cell identity of the first network device and a cell identity of the second network device.

Optionally, in an implementation of the second aspect, the method further includes:

obtaining, by the terminal device, cell indication information sent by the network device, where the cell indication information is used to indicate at least one of the following information:

cell identity information separately corresponding to the first control information and the second control information, path loss identifier information separately corresponding to the first control information and the second control information, beam reference signal identifier information separately corresponding to the first control information and the second control information, synchronization signal identifier information separately corresponding to the first control information and the second control information, mobility reference signal identifiers separately corresponding to the first control information and the second control information, and quasi co-location indication information separately corresponding to the first control information and the second control information; and the determining, by the terminal device, a correspondence between a network device and control information includes:

determining, by the terminal device, the correspondence according to the cell indication information.

Optionally, in an implementation of the second aspect, the first control information is sent by the first network device by using the first carrier, and the second control information is sent by the second network device by using the second carrier; or the first control information is sent by the second network device by using the first carrier, and the second control information is sent by the first network device by using the second carrier.

Therefore, in this embodiment of this application, the network device sends the configuration information, and for data scheduling on one carrier, the terminal device detects both a cross-carrier scheduling cell and a same-carrier scheduling cell. In this way, a prior-art problem that only control information on the data scheduling carrier is detected is resolved, and a conflict between resources for a plurality of pieces of control information of a same terminal device is avoided, so that the terminal device can accurately obtain control information sent by each transmission point, thereby improving network performance.

According to a third aspect, a first network device is provided, configured to perform the method in any one of the first aspect or the possible implementations of the first aspect. Specifically, the network device includes units configured to perform the foregoing method.

According to a fourth aspect, a terminal device is provided, configured to perform the method in any one of the second aspect or the possible implementations of the second aspect. Specifically, the second network device includes units configured to perform the foregoing method.

According to a fifth aspect, a first network device is provided. The network device includes a processor and a memory. The memory is configured to store a computer program. The processor is configured to execute the computer program stored in the memory, to perform the method in any one of the first aspect or the possible implementations of the first aspect.

According to a sixth aspect, a terminal device is provided. The terminal device includes a processor and a memory. The memory is configured to store a computer program. The processor is configured to execute the computer program stored in the memory, to perform the method in any one of the second aspect or the possible implementations of the second aspect.

According to a seventh aspect, a computer readable medium is provided. The computer readable medium stores a computer program, and when the computer program is executed by a computer, the method in any one of the first aspect or the possible implementations of the first aspect is performed.

According to an eighth aspect, a computer readable medium is provided. The computer readable medium stores a computer program, and when the computer program is executed by a computer, the method in any one of the second aspect or the possible implementations of the second aspect is performed.

According to a ninth aspect, a computer program product is provided. When the computer program product is executed by a computer, the method in any one of the first aspect or the possible implementations of the first aspect is performed.

According to a tenth aspect, a computer program product is provided. When the computer program product is executed by a computer, the method in any one of the second aspect or the possible implementations of the second aspect is performed.

According to an eleventh aspect, a processing apparatus is provided, including a processor and an interface, where the processor is configured to perform the method in any one of the first aspect or the possible implementations of the first aspect.

According to a twelfth aspect, a processing apparatus is provided, including a processor and an interface, where the processor is configured to perform the method in any one of the second aspect or the possible implementations of the second aspect.

It should be understood that the processing apparatus in the eleventh aspect or the twelfth aspect may be a chip, and the processor may be implemented by using hardware or software. When the processor is implemented by using hardware, the processor may be a logic circuit, an integrated circuit, or the like. When the processor is implemented by using software, the processor may be a general purpose processor, and is implemented by reading software code stored in a memory. The memory may be integrated into the processor, or may be located outside the processor and exist independently.

DESCRIPTION OF EMBODIMENTS

The following describes technical solutions in this application with reference to accompanying drawings.

Embodiments of this application may be applied to various communications systems. Therefore, the following descriptions are not limited to a specific communications system. For example, the embodiments of this application may be applied to a global system for mobile communications (Global System of Mobile communication, GSM), a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (Frequency Division Duplex, FDD) system, LTE time division duplex (Time Division Duplex, TDD), a universal mobile telecommunications system (Universal Mobile Telecommunication System, UMTS), and a next generation communications system, in other words, a 5th generation (5th Generation, 5G) communications system, for example, a new radio (New Radio, NR) system.

Figures 1, 2:
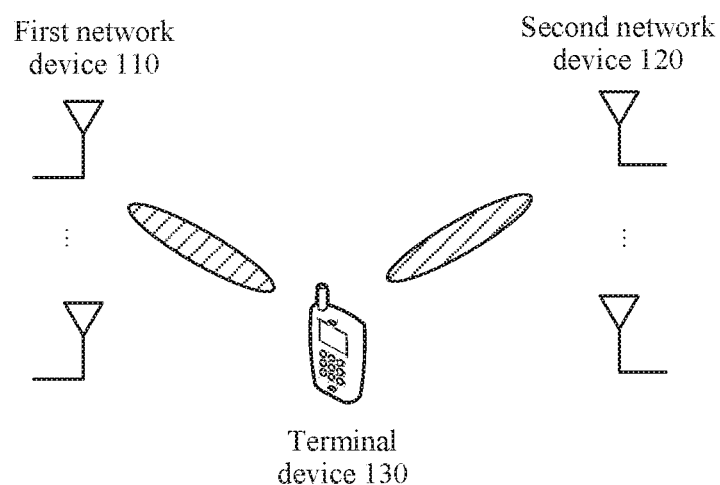
FIG. 1 is a schematic block diagram of a scenario system to which an embodiment of this application is applicable.
FIG. 2 is a schematic flowchart of a control information transmission method according to an embodiment of this application.

FIG. 1 is a schematic block diagram of a wireless communications system 100 to which an embodiment of this application is applicable. The wireless communications system 100 may include a first network device 110, a second network device 120, and one or more terminal devices 130 located within coverage of the first network device 110 and the second network device 120. The terminal device 130 may be movable or fixed. Both the first network device 110 and the second network device 120 may communicate with the terminal device 130 through an air interface. The first network device 110 and the second network device 120 may provide communication coverage for a specific geographical area, and may communicate with a terminal device located within the coverage.

It should be understood that "first", "second", and the like in the embodiments of this application are merely used for differentiation, and impose no limitation on the embodiments of this application. For example, the first network device may be exchanged with the second network device.

The first network device 110 or the second network device 120 may be a base transceiver station (Base Transceiver Station, BTS) in the global system for mobile communications (Global System of Mobile communication, GSM) or code division multiple access (Code Division Multiple Access, CDMA), or may be a NodeB (NodeB, NB) in wideband code division multiple access (Wideband Code Division Multiple Access, WCDMA), or may be an evolved NodeB (Evolutional Node B, eNB/eNodeB) in long term evolution (Long Term Evolution, LTE). Alternatively, the first network device 110 or the second network device 120 may be a relay node, an access point, a vehicle-mounted device, a wearable device, or a network-side device in a future 5G network, such as a transmission point (TRP or TP) in the NR system, a gNB (gNB) in the NR system, or one or a group (including a plurality of antenna panels) of antenna panels of a base station in the 5G system. This is not specifically limited in the embodiments of this application.

The terminal device 130 may also be referred to as user equipment (User Equipment, UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The access terminal may be a cellular phone, a cordless telephone set, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device or another processing device connected to a wireless modem, a vehicle-mounted device, a wearable device, an unmanned aerial vehicle, and a terminal device in the future 5G network.

The wireless communications system 100 can support COMP transmission, that is, at least two network devices (transmission points) transmit downlink data to the terminal device in a coordinated multipoint transmission/reception manner. In other words, the terminal device 130 may communicate with the first network device 110 or the second network device 120 on a same carrier. The coordinated multipoint transmission/reception manner may be implemented by using a space diversity technology and/or a spatial multiplexing technology. This is not limited in this application.

"Coordinated multipoint transmission/reception" in this application includes but is not limited to joint transmission JT. JT includes coherent JT and non-coherent JT (NCJT). A difference lies in that NCJT is used to separately perform beamforming on different MIMO data streams from a plurality of coordinated TPs, and coherent JT is used to perform joint beamforming on all MIMO data streams from a plurality of coordinated TPs.

In a joint transmission mode, at least two transmission points (Transfer point, TRP) separately send control information to the terminal device through control channels. The terminal device simultaneously receives, on a same carrier, the control information sent by the at least two transmission points. Because the plurality of pieces of control information are sent by using the same carrier, a resource conflict exists. Consequently, the terminal device cannot accurately obtain control information sent by each transmission point, thereby affecting network performance.

In a scenario in which coordinated multipoint transmission/reception is applied, both a serving network device and a coordinated network device may send control signaling to the terminal device, and both the serving network device and the coordinated network device may send data to the terminal device.

In the prior art, the terminal device simultaneously receives, on a same carrier, control information sent by at least two transmission points. Because the plurality of pieces of control information are sent by using the same carrier, a resource conflict exists. Consequently, the terminal device cannot accurately obtain control information sent by each transmission point, thereby affecting network performance.

This embodiment of this application provides a control information transmission method. Control information for scheduling data on a same carrier is sent on different carriers, so that the terminal device can accurately obtain each piece of control information. In this way, the foregoing problem can be resolved, and network performance can be improved.

In this embodiment of this application, the first network device may serve as a serving network device, and the second network device may be a coordinated network device; or the first network device may be a coordinated network device, and the second network device is a serving network device; or both the first network device and the second network device may be coordinated network devices; or both the first network device and the second network device may be serving network devices. This is not limited in this embodiment of this application.

It should be understood that a joint transmission scenario to which this embodiment of this application is applicable and that is shown in FIG. 1 may be a joint transmission scenario of a homogeneous network or a joint transmission scenario of a heterogeneous network. This is not limited in this embodiment of this application.

It should be further understood that the scenario shown in FIG. 1 may be a low-frequency scenario or a high-frequency scenario. This is not limited in this embodiment of this application.

For ease of understanding and description, by way of example but not limitation, the following describes execution processes and actions of the control information transmission method in this application in the communications system.

It should be noted that some names and English abbreviations in this specification are descriptions of the embodiments of this application by using an LTE system as an example. However, the embodiments of this application are not limited thereto. The names and English abbreviations may vary with evolution of a network. For specific evolution, refer to descriptions in a corresponding standard. For example, refer to corresponding descriptions in 5G.

FIG. 2 is a schematic flowchart of a control information transmission method according to an embodiment of this application. The method shown in FIG. 2 includes the following steps.

210. A first network device sends configuration information to a terminal device.

Specifically, the first configuration information is used to instruct the terminal device to detect first control information on a first carrier and detect second control information on a second carrier, and both the first control information and the second control information are control information for scheduling data on the second carrier.

It should be understood that, in this embodiment of this application, a carrier may be in a one-to-one correspondence with a cell. For example, a cell 1 corresponds to a carrier 1, and a cell 2 corresponds to a carrier 2. Alternatively, one carrier may correspond to a plurality of cells. For example, a carrier 1 corresponds to a cell 1, and the carrier 1 also corresponds to a cell 2. Alternatively, a plurality of carriers may correspond to one cell. For example, a carrier 1 corresponds to a cell 1, and a carrier 2 also corresponds to the cell 1.

Optionally, a carrier in this embodiment of this application may alternatively correspond to a segment of frequency domain resources, for example, one carrier may include one or more bandwidth parts. The carder in this embodiment of this application may be a bandwidth part.

Optionally, the carrier in this embodiment of this application may be alternatively a component carder (Component Carrier, CC) in carrier aggregation. This embodiment of this application is not limited thereto.

It should be understood that both the first control information and the second control information are used to schedule data on the second carrier. For example, the first control information and the second control information are used to schedule data on a physical downlink shared channel (Physical Downlink Shared Channel, PDSCH) in the second carrier; or the first control information and the second control information are used to schedule a physical uplink shared channel (Physical Uplink Shared Channel, PUSCH) in the second carrier; or the first control information is used to schedule data on a physical downlink shared channel in the second carrier, and the second control information is used to schedule data on a physical uplink shared channel in the second carrier; or the first control information is used to schedule data on a physical uplink shared channel in the second carrier, and the second control information is used to schedule data on a physical downlink shared channel in the second carrier. This is not specifically limited herein. For example, the first control information and the second control information may be DCI information.

For example, the first control information and the second control information may be sent by a network device through a physical downlink control channel (Physical Downlink Control Channel, PDCCH).

The first network device may send the configuration information by using higher layer signaling such as radio resource control (Radio Resource Control, RRC) signaling or medium access control (Medium Access Control, MAC) signaling, or may send the configuration information by using other signaling. This is not specifically limited herein.

Optionally, in another embodiment, the configuration information may include first identifier information and second identifier information, the first identifier information is used to indicate the first carrier, and the second identifier information is used to indicate the second carrier.

For example, the first identifier information includes an identity ID of the first carrier or an ID of a first cell corresponding to the first carrier, and the second identifier information includes an ID of the second carrier or an ID of a second cell corresponding to the second carrier.

Optionally, in another embodiment, the configuration information may include same-carrier scheduling information and cross-carrier scheduling information.

For example, the same-carrier scheduling information is used to indicate that scheduling information of data on a carrier is sent on a control channel of the carrier, and the cross-carrier scheduling information is used to indicate that scheduling information of data on a carrier is sent on control information of another carrier.

For example, it is assumed that there are two carriers: the first carrier and the second carrier, both the first network device and the second network device schedule data on the second carrier, the first network device performs cross-carrier scheduling, and the second network device performs same-carrier scheduling. In this case, scheduling information of data on the second carrier corresponding to the first network device is sent by using the first carrier, and scheduling information of data on the second carrier corresponding to the second network device is sent by using the second carrier.

In this embodiment of this application, the configuration information can indicate that the terminal device needs to detect control information of a plurality of carriers for data scheduling on one carrier. For example, for data scheduling on the second carrier, the terminal device needs to detect control information that is for data scheduling on the second carrier and that is sent by using the first carrier and the second carrier. In other words, the configuration information may be used to configure the second carrier of the terminal device to an enhanced cross-carrier scheduling state. That is, for the second carrier, the terminal device needs to perform PDCCH detection (that is, detect the first control information sent on the first carrier) of cross-carrier scheduling, and also needs to perform PDCCH detection (that is, detect the second control information sent on the second carrier) of same-carrier scheduling.

Specifically, by way of example but not limitation, the network device may send the configuration information by using the following signaling:

```
PhysicalConfig ::=   SEQUENCE {
    -- DL configuration as well as configuration applicable for DL and UL
    enhanced-crossCarrierSchedulingConfig
    Enhanced-CrossCarrierSchedulingConfig OPTIONAL,      - Need ON
}
Enhanced-CrossCarrierSchedulingConfig ::=              SEQUENCE {
    schedulingCellInfo            SEQUENCE {
        own                       SEQUENCE { - No cross carrier scheduling
            cif-Presence                  BOOLEAN
        },
        other                     SEQUENCE { -- Cross carrier scheduling
```

```
    schedulingCellId         ServCellIndex,
    pdsch-Start                    INTEGER (1 . . . 4)
    cif-InSchedulingCell          INTEGER (1 . . . 7)
   }
  }
 }
```

Configuration code is described as follows:

enhanced-crosscarrierSchedulingConfig (a signaling domain is used to configure the enhanced cross-carrier scheduling state); and enhanced-CrossCarrierSchedulingConfig (used to indicate configuration information of the enhanced cross-carrier scheduling state).

Configuration information of same-cell scheduling may include at least one of the following information:

schedulingCellInfo (scheduling cell information or scheduling carrier information);

own (own scheduling); and cif-Presence (a CIF value is used to detect same-cell scheduling information, and a CIF is a carrier indication field).

Configuration information of cross-carrier scheduling may include at least one of the following information:

schedulingCellId (an identifier information field of a scheduling cell that is used to indicate an identifier of a scheduling cell or a carrier);

pdsch-Start (a PDSCH start information field that is used to indicate a symbol location from which a PDSCH starts);

pusch-Start (a PDSCH start information field that is used to indicate a symbol location from which a PUSCH starts); and cif-InSchedulingCell (a CIF value is used to detect cross-carrier scheduling information).

It should be understood that names and values of the foregoing signaling are merely examples. During actual application, the foregoing signaling may use other names and values. This embodiment of this application is not limited thereto.

220. The first network device sends at least one of the first control information and the second control information.

Figure 3:
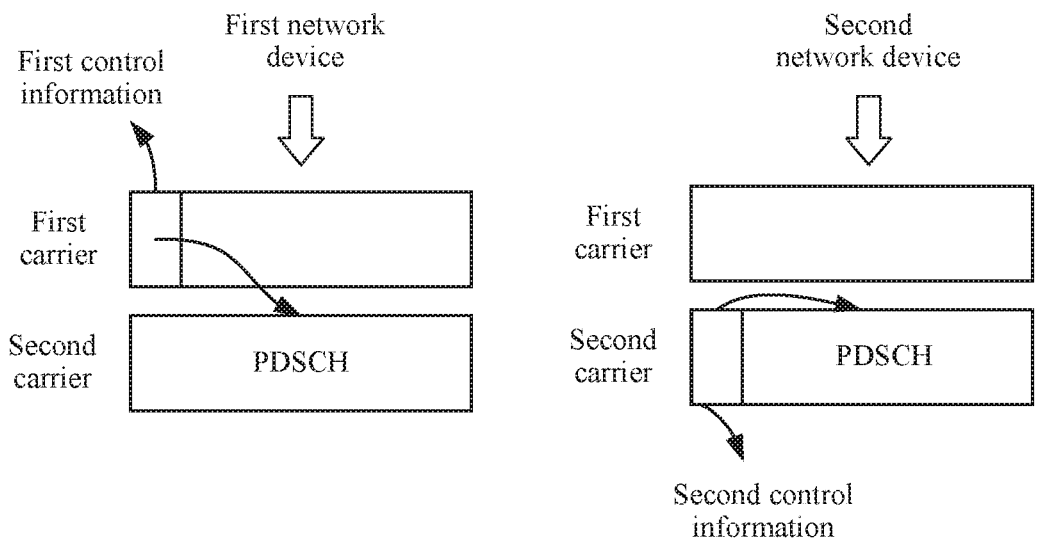
FIG. 3 is a schematic block diagram of control information transmission according to an embodiment of this application.
Figure 4:
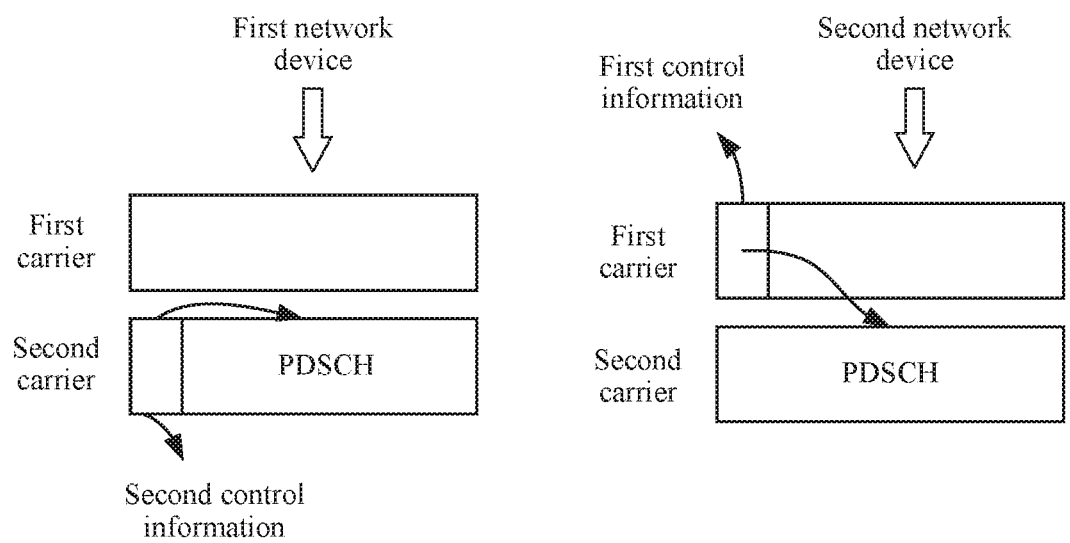
FIG. 4 is a schematic block diagram of control information transmission according to another embodiment of this application.

In one case, the first network device sends the first control information or the second control information. For example, in a joint transmission scenario shown in FIG. 1, as shown in FIG. 3, the first network device may send the first control information, and the second network device sends the second control information; or as shown in FIG. 4, the first network device sends the second control information, and the second network device sends the first control information.

It should be understood that in this specification, for ease of description, that only the first network device sends the configuration information is described in step 210. However, this embodiment of this application is not limited thereto. For example, a network device sending the configuration information may be either of the first network device and the second network device that perform joint transmission, for example, the second network device sends the configuration information.

Further, optionally, the network device sending the configuration information may be the same as or different from a network device sending control information. For example, a device other than the first network device and the second network device sends the configuration information. For example, a third network device sends the configuration information, and the first network device or the second network device sends the control information. This is not specifically limited herein.

Optionally, in this embodiment of this application, the configuration information may not be sent. In this case, the terminal device does not need an indication from the network device, and for scheduled data on a carrier, the terminal device may detect control information on a plurality of carriers based on a preset system configuration.

For example, the terminal device may determine, based on a current transmission mode, to detect scheduling information of a same carrier on the plurality of carriers. For example, the transmission mode includes a single cell transmission mode or a coordinated transmission mode. Alternatively, the terminal device determines, based on carrier configuration information, to detect scheduling information on the plurality of carriers. For example, the terminal device configures only two, three, or more carriers, and the terminal device may detect scheduling information on the two, three, or more carriers based on a preset configuration.

Correspondingly, after receiving the configuration information, the terminal device detects both control information (namely, the first control information) on the first carrier and control information (namely, the second control information) on the second carrier for scheduled data on the second carrier according to an indication of the obtained configuration information (or based on the preset system configuration).

Therefore, in this embodiment of this application, the network device sends the configuration information and configures enhanced cross-carrier scheduling, and for data scheduling on one carrier, the terminal device detects both a cross-carrier scheduling cell and a same-carrier scheduling cell. In this way, a prior-art problem that only control information on the data scheduling carrier is detected is resolved, and a conflict between resources for a plurality of pieces of control information of a same terminal device is avoided, so that the terminal device can accurately obtain control information sent by each transmission point, thereby improving network performance.

In another case, the first network device sends the first control information and the second control information. For example, in a coordinated scenario, the first network device may obtain scheduling information of the second network device, so that the first network device sends scheduling information of the first network device and the scheduling information of the second network device. In addition, when control channel resources on the second carrier are limited, the first network device may send the first control information on the first carrier, and send the second control information on the second carrier.

Therefore, in this embodiment of this application, the first network device sends the two pieces of control information, and the second network device does not need to send control information, so that signaling overheads of the second network device can be reduced, resource pressure of the second carrier can be reduced, and network performance can be improved.

Figure 5:
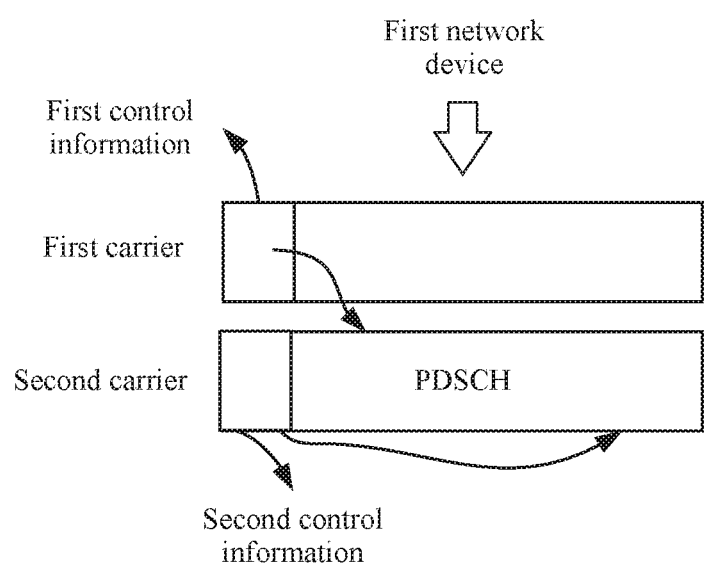
FIG. 5 is a schematic block diagram of control information transmission according to another embodiment of this application.

In one case, the first network device sends the first control information and the second control information. For example, as shown in FIG. 5, in a non-joint transmission scenario, for a single-scheduling scenario of the first network device, the first network device may send two pieces of control information of a same carrier (the second carrier) by using two carriers (the first carrier and the second carrier), namely, the first control information and the second control information.

For example, the first control information may be control information for scheduled data that is retransmitted on the second carrier; and the second control information may be control information for scheduled data that is newly transmitted on the second carrier.

Correspondingly, after receiving the configuration information the terminal device detects both control information (namely, the first control information) on the first carrier and control information (namely, the second control information) on the second carrier for the scheduled data on the second carrier according to an indication of the configuration information.

In an existing solution, the network device first sends the control information of the retransmitted data, and then sends the control information of the newly transmitted data. However, in this embodiment of this application, the control information of the retransmitted data and the control information of the newly transmitted data are separately sent on the two carriers at a same scheduling moment, so that the terminal device can simultaneously obtain a plurality of pieces of control information. In this way, a disadvantage of transmitting control information in a single transmission method in the existing solution is overcome, communication efficiency can be increased, and network performance can be improved.

It should be understood that, in this embodiment of this application, the same scheduling moment may be a same scheduling moment unit such as a same subframe, a same slot, or a same mini-slot.

In this embodiment of this application, optionally, the configuration information or the preset system configuration is used to instruct the terminal device to separately detect control information on the first carrier and the second carrier. However, during actual transmission, the first network device or the second network device may alternatively not send the control information. That is, even though the configuration information or the preset system configuration is used to instruct the terminal device to detect the first control information and the second control information, the terminal device may actually detect the first control information and the second control information, or the terminal device may detect only the first control information, or the terminal device may detect only the second control information, or the terminal device may detect neither the first control information nor the second control information. This is not specifically limited herein.

For example, in a non-ideal backhaul scenario, there is a latency in interaction between network devices. Therefore, a network device may determine a carrier on which the network device sends control information. For example, the first network device sends the control information on the first carrier, and the second network device sends the control information on the second carrier. In this way, a conflict between resources on which control information sent by a plurality of network devices are located can be avoided.

However, during actual scheduling, at a scheduling moment, the first network device may send the control information, or the second network device may send the control information, or both the first network device and the second network device may send the control information. The actual scheduling situation is specifically subject to current scheduling performed by a network device. This is not specifically limited herein.

Optionally, in another embodiment, in a joint transmission scenario, the method may further include:

determining, by the terminal device, a correspondence between a network device and control information, where the correspondence includes that the first network device corresponds to the first control information carried on the first carrier, and that the second network device corresponds to the second control information carried on the second carrier; or the correspondence includes that the first network device corresponds to the second control information carried on the second carrier, and that the second network device corresponds to the first control information carried on the first carrier.

Therefore, when the terminal device determines the correspondence between a network device and control information, the terminal device may determine, based on detected control information, a specific network device sending the control information, so that the terminal device performs a corresponding uplink feedback based on the correspondence, for example, performs power control, resource determining, or beam determining of uplink transmission.

In the joint transmission scenario described above, in this embodiment of this application, the first network device sends the first control information, and the second network device sends the second control information; or the first network device sends the second control information, and the second network device sends the first control information. The following describes, with reference to a specific example, how the first network device and the second network device determine whether to send the first control information or the second control information, and how the terminal device determines the correspondence between a network device and control information.

In this embodiment of this application, the network device may determine, based on a plurality of cases, whether to specifically send the first control information or the second control information. The cases are described below.

In Case 1, in this embodiment of this application, signaling may be exchanged between the first network device and the second network device, and a specific carrier on which control information is sent is determined based on a traffic volume. In this case, the network device further needs to send cell indication information, to indicate a network device corresponding to each piece of control information to the terminal device. For Case 1, the control information transmission method in this embodiment of this application is described in detail with reference to specific examples in FIG. 6 and FIG. 7.

In Case 2, in this embodiment of this application, the first network device and the second network device may determine, in a predefined manner, a specific carrier on which control information is sent. Correspondingly, the terminal device may also determine, in the predefined manner, a network device corresponding to each piece of control information. For Case 2, the control information transmission method in this embodiment of this application is described in detail with reference to specific examples in FIG. 8 and FIG. 9.

Figure 6:
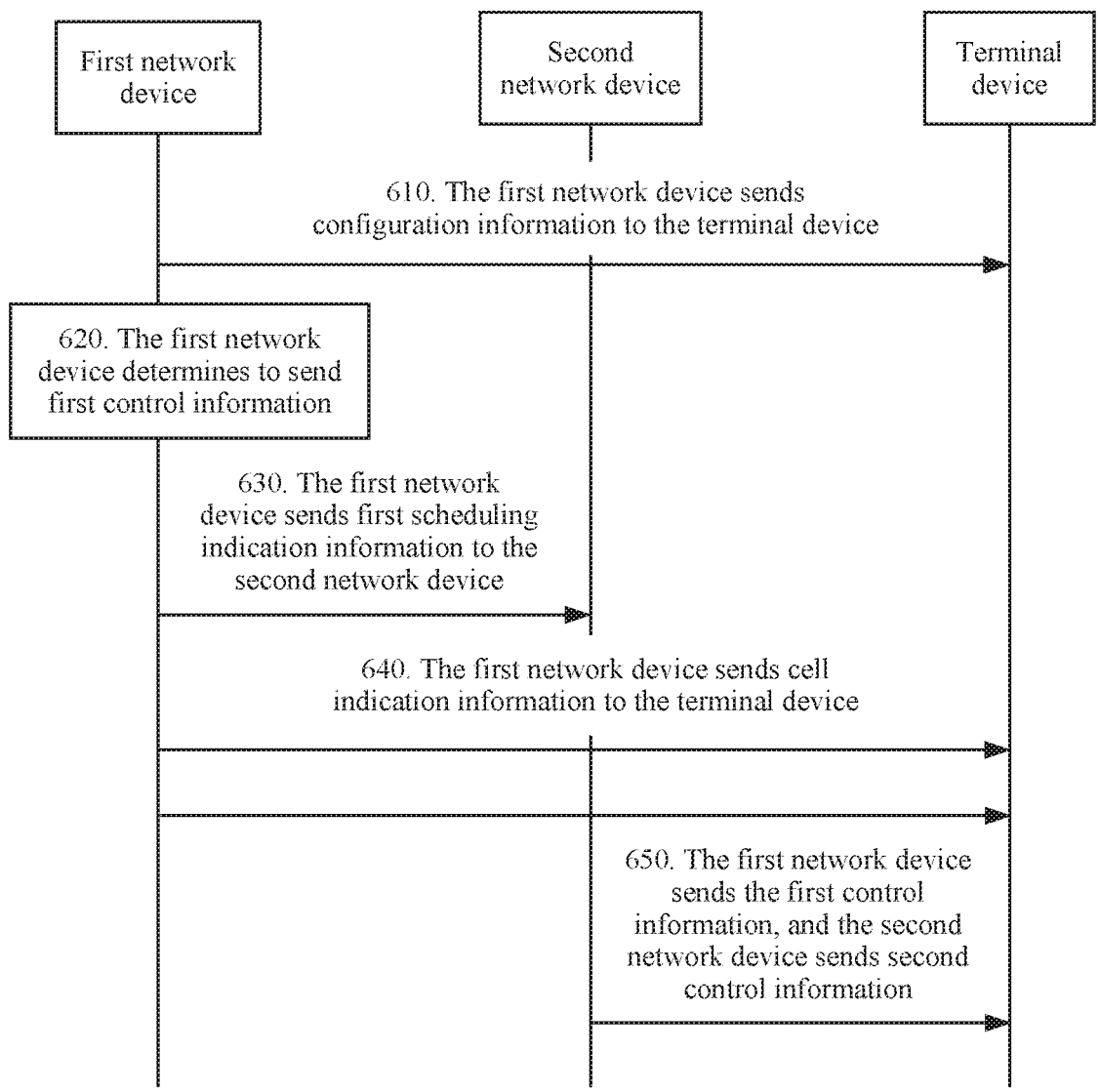
FIG. 6 is a schematic flowchart of a control information transmission method according to another embodiment of this application.

A method 600 shown in FIG. 6 includes the following steps.

610. A first network device sends configuration information to a terminal device.

Specifically, step 610 corresponds to step 210. For specific content in step 610, refer to the corresponding descriptions of step 210. To avoid repetition, details are not described herein again.

620. The first network device determines to send first control information.

Specifically, the first network device determines, based on a traffic volume on a first carrier or a second carrier, to send the first control information on the first carrier.

Specifically, the first network device sends the first control information on the first carrier when a traffic volume of the first network device on the second carrier is greater than a preset traffic volume threshold.

Specifically, optionally, the first network device sends the first control information on the first carrier when a traffic volume of the first network device on the first carrier is less than a preset traffic volume threshold.

Specifically, optionally, the first network device sends the first control information on the first carrier when a traffic volume of the first network device on the first carrier is less than a traffic volume of the first network device on the second carrier.

It should be understood that the preset traffic volume threshold in this embodiment of this application is a determined value, and may be considered as a value preset in a system. Preferably, a predetermined value in this embodiment of this application may be directly used, and may be obtained without calculation or other solution. During actual application, the traffic volume threshold may be determined based on an actual case. The traffic volume threshold is not limited in this embodiment of this application.

Optionally, when the first network device determines to send the first control information on the first carrier, the method further includes the following step:

630. The first network device sends first scheduling indication information to a second network device, where the first scheduling indication information is used to instruct the second network device to send second control information by using the second carrier.

Alternatively, the first scheduling indication information is used to instruct the first network device to send the first control information on the first carrier. After the second network device receives the first scheduling indication information, it may be learned that the first network device sends the first control information on the first carrier, and it may be further learned that the second network device needs to send the second control information by using the second carrier.

Further, optionally, the second network device may feed back, to the first network device, a message about whether the second network device may send the second control information on the second carrier. In other words, the first network device and the second network device may negotiate about specific carriers on which the first network device and the second network device transmit the control information.

It should be understood that, in this embodiment of this application, a traffic volume may indicate an amount of data carried on a carrier, or may indicate a quantity of users in a carrier (cell), or may indicate a quantity of pieces of scheduling information that need to be sent on a carrier, or may indicate a size of a control channel resource set of a carrier. This embodiment of this application is not limited thereto.

After a network device determines a carrier on which the network device sends control information, because the terminal device does not know which carrier (or which piece of control information) corresponds to which network device, optionally, the network device further needs to send cell indication information, to indicate a network device corresponding to each piece of control information to the terminal device. Correspondingly, the method in this embodiment of this application further includes the following step:

640. The first network device sends cell indication information to the terminal device.

The cell indication information is used to indicate at least one of the following information:

cell identity information, path loss identifier information, beam reference signal (Beam Reference Signal, BRS) identifier information, synchronization signal (Synchronization Signal, SS) identifier information, mobility reference signal (Mobility Reference Signal, MRS) identifier information, and quasi co-location (Quasi Co-Located) indication information.

Alternatively, the cell indication information is used to indicate at least one of the following information:

cell identity information separately corresponding to the first control information and the second control information, path loss identifier information separately corresponding to the first control information and the second control information, beam reference signal identifier information separately corresponding to the first control information and the second control information, synchronization signal identifier information separately corresponding to the first control information and the second control information, mobility reference signal identifiers separately corresponding to the first control information and the second control information, and quasi co-location indication information separately corresponding to the first control information and the second control information.

The cell identity information is used to indicate information about a cell identity, the path loss identifier information is used to indicate information about a path loss, the beam reference signal identifier information is used to indicate information about a beam, the synchronization signal identifier information is used to indicate information about a synchronization signal, the mobility reference signal identifier information is used to indicate information about a mobility-related reference signal, and the quasi co-location indication information is used to indicate quasi co-location information corresponding to an antenna port for sending control information.

That the cell indication information is sent by the first network device is described above. However, this embodiment of this application is not limited thereto. For example, a network device sending the cell indication information may be either of the first network device and the second network device that perform joint transmission, for example, the second network device sends the cell indication information.

Further, optionally, the network device sending the cell indication information may be the same as or different from a network device sending control information. For example, a device other than the first network device and the second network device sends the cell indication information. For example, a fourth network device sends the cell indication information, and the first network device or the second network device sends the control information. This is not specifically limited herein.

It should be understood that the fourth network device may be the same as or different from the third network device.

In this way, the terminal device may learn of a correspondence between a network device and control information according to the cell indication information, so that the terminal device can perform a corresponding uplink feedback, for example, perform power control, resource determining, or beam determining of uplink transmission.

The correspondence includes that the first network device corresponds to the first control information carried on the first carrier, and that the second network device corresponds to the second control information carried on the second carrier; or that the first network device corresponds to the second control information carried on the second carrier, and that the second network device corresponds to the first control information carried on the first carrier; or that the first network device corresponds to the second control information carried on the second carrier and the first control information carried on the first carrier; or that the second network device corresponds to the second control information carried on the second carrier and the first control information carried on the first carrier.

Specifically, the first network device may send the cell indication information by using the following signaling:

```
Enhanced-CrossCarrierSchedulingConfig ::=        SEQUENCE {
    schedulingCellInfo-r10              SEQUENCE {
        own                             SEQUENCE {
-- No cross carrier scheduling
            cif-Presence                            BOOLEAN
            cellId/pathloss ID/BRS ID/SSID/MRS ID
        },
        other                                   SEQUENCE {
-- Cross carrier scheduling
            schedulingCellId                    ServCellIndex,
            pdsch-Start                         INTEGER (1 . . . 4)
            cif-InSchedulingCell                INTEGER (1 . . . 7)
            cellid/pathloss ID/BRS ID/SSID/MRS ID /QCL
        }
    }
}
```

The cellId/pathloss ID/BRS ID/SSID/MRS ID/QCL may sequentially indicate the cell identity information/path loss identifier information/beam reference signal identifier information/synchronization signal identifier information/mobility reference signal identifier information/quasi co-location indication information. The specific signaling names and values are merely examples, and other names and values may be selected. This is not specifically limited herein.

650. The first network device sends the first control information, and the second network device sends the second control information.

FIG. 6 describes the case in which the first network device sends the first control information and the second network device sends the second control information. Alternatively, the first network device may send the second control information, and the second network device sends the first control information.

Correspondingly, step 620 may be replaced with a case in which the first network device determines to send the second control information.

For example, the first network device sends the second control information on the second carrier when a traffic volume of the first network device on the first carrier is greater than a preset traffic volume threshold.

Specifically, optionally, the first network device sends the first control information on the first carrier when a traffic volume of the first network device on the second carrier is less than a preset traffic volume threshold.

Specifically, optionally, the first network device sends the second control information on the second carrier when a traffic volume of the first network device on the second carrier is less than a traffic volume of the first network device on the first carrier.

When the first network device determines to send the first control information on the first carrier, step 630 may be replaced with a case in which the first network device sends second scheduling indication information to the second network device, where the second scheduling indication information is used to instruct the second network device to send the first control information by using the first carrier.

Alternatively, the second scheduling indication information is used to instruct the first network device to send the second control information on the second carrier. After the second network device receives the second scheduling indication information, it may be learned that the first network device sends the second control information on the second carrier, and it may be further learned that the second network device needs to send the first control information by using the first carrier.

Further, optionally, the second network device may feed back, to the first network device, a message about whether the second network device may send the first control information on the first carrier. In other words, the first network device and the second network device may negotiate about specific carriers on which the first network device and the second network device transmit the control information.

Correspondingly, the correspondence in step 640 may correspondingly vary. That is, the correspondence includes that the first network device corresponds to the second control information carried on the second carrier, and that the second network device corresponds to the first control information carried on the first carrier; or that the first network device corresponds to the second control information carried on the second carrier, and that the second network device corresponds to the first control information carried on the first carrier; or that the first network device corresponds to the second control information carried on the second carrier and the first control information carried on the first carrier; or that the second network device corresponds to the second control information carried on the second carrier and the first control information carried on the first carrier. Step 650 may be replaced with a case in which the first network device sends the second control information and the second network device sends the first control information.

Alternate steps of the steps in FIG. 6 are similar to the corresponding steps in FIG. 6. For a specific process, refer to the foregoing descriptions. To avoid repetition, details are not described herein again.

In this embodiment of this application, optionally, the configuration information or a preset system configuration is used to instruct the terminal device to separately detect control information on the first carrier and the second carrier. However, during actual transmission, the first network device or the second network device may alternatively not send the control information. That is, even though the configuration information or the preset system configuration is used to instruct the terminal device to detect the first control information and the second control information, the terminal device may actually detect the first control information and the second control information, or the terminal device may detect only the first control information, or the terminal device may detect only the second control information, or the terminal device may detect neither the first control information nor the second control information. This is not specifically limited herein.

For example, in a non-ideal backhaul scenario, there is a latency in interaction between network devices. Therefore, a network device may determine a carrier on which the network device sends control information. For example, the first network device sends the control information on the first carrier, and the second network device sends the control information on the second carrier. In this way, a conflict between resources on which control information sent by a plurality of network devices are located can be avoided. However, during actual scheduling, at a scheduling moment, the first network device may send the control information, or the second network device may send the control information, or both the first network device and the second network device may send the control information. The actual scheduling situation is specifically subject to current scheduling performed by a network device. This is not specifically limited herein.

Therefore, in this embodiment of this application, the network device sends the configuration information, and for data scheduling on one carrier, the terminal device detects both a cross-carrier scheduling cell and a same-carrier scheduling cell. In this way, a prior-art problem that only control information on the data scheduling carrier is detected is resolved, and a conflict between resources for a plurality of pieces of control information of a same terminal device is avoided, so that the terminal device can accurately obtain control information sent by each transmission point, thereby improving network performance.

Figure 7:
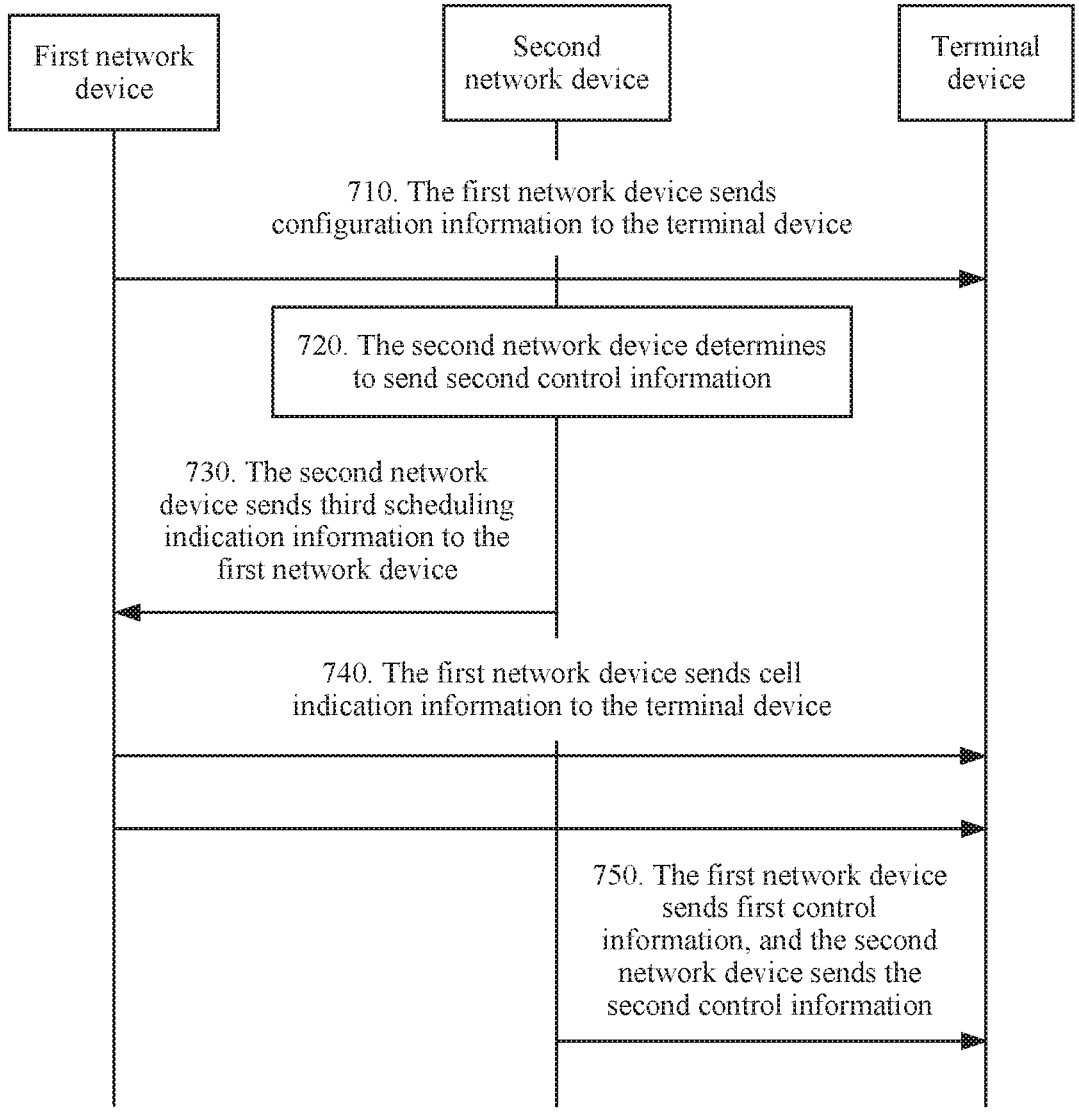
FIG. 7 is a schematic flowchart of a control information transmission method according to another embodiment of this application.

A method 700 shown in FIG. 7 includes the following steps.

710. A first network device sends configuration information to a terminal device.

Specifically, step 710 corresponds to step 210. For specific content in step 710, refer to the corresponding descriptions of step 210. To avoid repetition, details are not described herein again.

720. A second network device deter determines to send second control information.

Specifically, the second network device determines, based on a traffic volume on a first carrier or a second carrier, to send the second control information on the second carrier.

Specifically, the second network device sends the second control information on the second carrier when a traffic volume of the second network device on the first carrier is greater than a preset traffic volume threshold.

Specifically, optionally, the first network device sends the second control information on the second carrier when a traffic volume of the second network device on the second carrier is less than a preset traffic volume threshold.

Specifically, optionally, the second network device sends the second control information on the second carrier when a traffic volume of the second network device on the second carrier is less than a traffic volume of the first network device on the first carrier.

Optionally, when the second network device determines to send the second control information on the second carrier, the method further includes the following step:

730. The second network device sends third scheduling indication information to the first network device, where the third scheduling indication information is used to instruct the first network device to send the first control information by using the first carrier.

Correspondingly, the first network device sends the first control information according to the third scheduling indication information.

Alternatively, the third scheduling indication information is used to instruct the first network device to send the second control information on the second carrier. After the second network device receives the third scheduling indication information, it may be learned that the first network device sends the second control information on the second carrier, and it may be further learned that the second network device needs to send the first control information by using the first carrier.

Further, optionally, the second network device may feed back, to the first network device, a message about whether the second network device may send the first control information on the first carrier. In other words, the first network device and the second network device may negotiate about specific carriers on which the first network device and the second network device transmit the control information.

Similar to the embodiment in FIG. 6, after a network device determines a carrier on which the network device sends control information, because the terminal device does not know which carrier (or which piece of control information) corresponds to which network device, optionally, the network device further needs to send cell indication information, to indicate a network device corresponding to each piece of control information to the terminal device. Correspondingly, the method in this embodiment of this application further includes the following step:

740. The first network device sends cell indication information to the terminal device.

Step 740 is similar to step 640. To avoid repetition, details are not described herein again.

In this way, the terminal device may learn of a correspondence between a network device and control information according to the cell indication information, so that the terminal device can perform a corresponding uplink feedback, for example, perform power control, resource determining, or beam determining of uplink transmission.

750. The first network device sends the first control information, and the second network device sends the second control information.

In FIG. 7, the second network device first determines a carrier used to send control information, and then indicates, by sending indication information, another carrier used by the first network device to send the control information. FIG. 7 describes the case in which the first network device sends the first control information and the second network device sends the second control information. Alternatively, FIG. 7 may be replaced with a case in which the first network device may send the second control information and the second network device sends the first control information. Correspondingly, for alternate steps, refer to the foregoing alternate steps in FIG. 6. To avoid repetition, details are not described herein again.

In this embodiment of this application, optionally, the configuration information or a preset system configuration is used to instruct the terminal device to separately detect control information on the first carrier and the second carrier. However, during actual transmission, the first network device or the second network device may alternatively not send the control information. That is, even though the configuration information or the preset system configuration is used to instruct the terminal device to detect the first control information and the second control information, the terminal device may actually detect the first control information and the second control information, or the terminal device may detect only the first control information, or the terminal device may detect only the second control information, or the terminal device may detect neither the first control information nor the second control information. This is not specifically limited herein.

For example, in a non-ideal backhaul scenario, there is a latency in interaction between network devices. Therefore, a network device may determine a carrier on which the network device sends control information. For example, the first network device sends the control information on the first carrier, and the second network device sends the control information on the second carrier. In this way, a conflict between resources on which control information sent by a plurality of network devices are located can be avoided. However, during actual scheduling, at a scheduling moment, the first network device may send the control information, or the second network device may send the control information, or both the first network device and the second network device may send the control information. The actual scheduling situation is specifically subject to current scheduling performed by a network device. This is not specifically limited herein.

Therefore, in this embodiment of this application, the network device sends the configuration information, and for data scheduling on one carrier, the terminal device detects both a cross-carrier scheduling cell and a same-carrier scheduling cell. In this way, a prior-art problem that only control information on the data scheduling carrier is detected is resolved, and a conflict between resources for a plurality of pieces of control information of a same terminal device is avoided, so that the terminal device can accurately obtain control information sent by each transmission point, thereby improving network performance.

Figure 8:
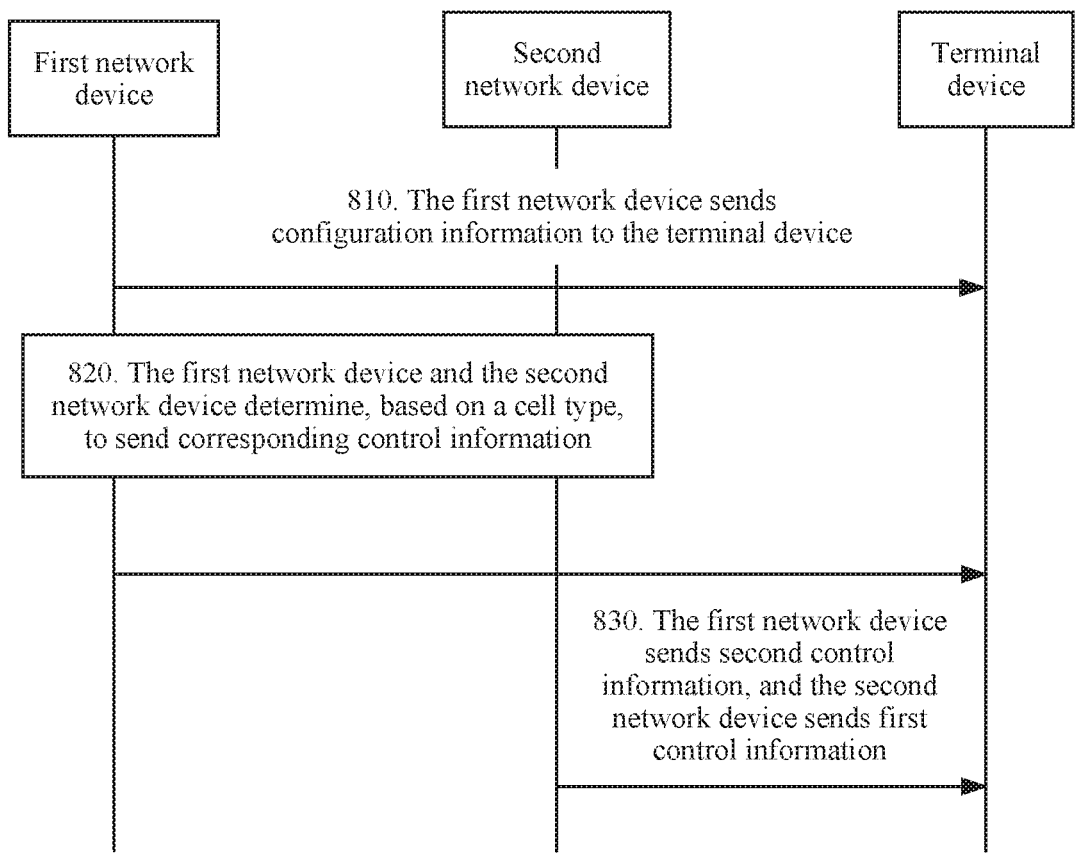
FIG. 8 is a schematic flowchart of a control information transmission method according to another embodiment of this application.

A method 800 shown in FIG. 8 includes the following steps.

810. A first network device sends configuration information to a terminal device.

Specifically, step 810 corresponds to step 210. For specific content in step 810, refer to the corresponding descriptions of step 210. To avoid repetition, details are not described herein again.

820. The first network device and a second network device determine, based on a cell type, to send corresponding control information.

For example, a predefined manner is that same-carrier scheduling is performed for a serving cell and cross-carrier scheduling is performed for a coordinated cell. Assuming that the first network device corresponds to the serving cell, and the second network device corresponds to the coordinated cell, the first network device performs same-carrier scheduling for data scheduling on a second carrier based on the predefined manner. Therefore, the first network device sends second control information by using the second carrier, the second network device performs cross-carrier scheduling, and the second network device sends first control information by using a first carrier.

Alternatively, a predefined manner is that cross-carrier scheduling is performed for a serving cell and same-carrier scheduling is performed for a coordinated cell. Assuming that the first network device corresponds to the serving cell, and the second network device corresponds to the coordinated cell, the first network device performs cross-carrier scheduling for data scheduling on a second carrier based on the predefined manner. Therefore, the first network device sends first control information by using a first carrier, the second network device performs same-carrier scheduling, and the second network device sends second control information by using the second carrier.

Alternatively, another predefined manner is used. This is not limited herein.

Further, optionally, a network device sending the configuration information may be the same as or different from a network device sending control information. For example, a third network device sends the configuration information, and the first network device or the second network device sends the control information. This is not specifically limited herein.

830. The first network device sends the second control information, and the second network device sends the first control information.

Correspondingly, the terminal device may also determine, based on the predefined manner, a network device corresponding to each piece of control information, so that the terminal device can perform a corresponding uplink feedback, for example, perform power control, resource determining, or beam determining of uplink transmission.

Certainly, in a variant manner of FIG. 8, the first network device sends the first control information, and the second network device sends the second control information. This manner is similar to the descriptions in FIG. 8. To avoid repetition, details are not described herein again.

During actual transmission, the first network device or the second network device may alternatively not send the control information. That is, even though the configuration information or a preset system configuration is used to instruct the terminal device to detect the first control information and the second control information, the terminal device may actually detect the first control information and the second control information, or the terminal device may detect only the first control information, or the terminal device may detect only the second control information, or the terminal device may detect neither the first control information nor the second control information. This is not specifically limited herein.

Therefore, in this embodiment of this application, the network device sends the configuration information, and for data scheduling on one carrier, the terminal device detects both a cross-carrier scheduling cell and a same-carrier scheduling cell. In this way, a prior-art problem that only control information on the data scheduling carrier is detected is resolved, and a conflict between resources for a plurality of pieces of control information of a same terminal device is avoided, so that the terminal device can accurately obtain control information sent by each transmission point, thereby improving network performance.

Figure 9:
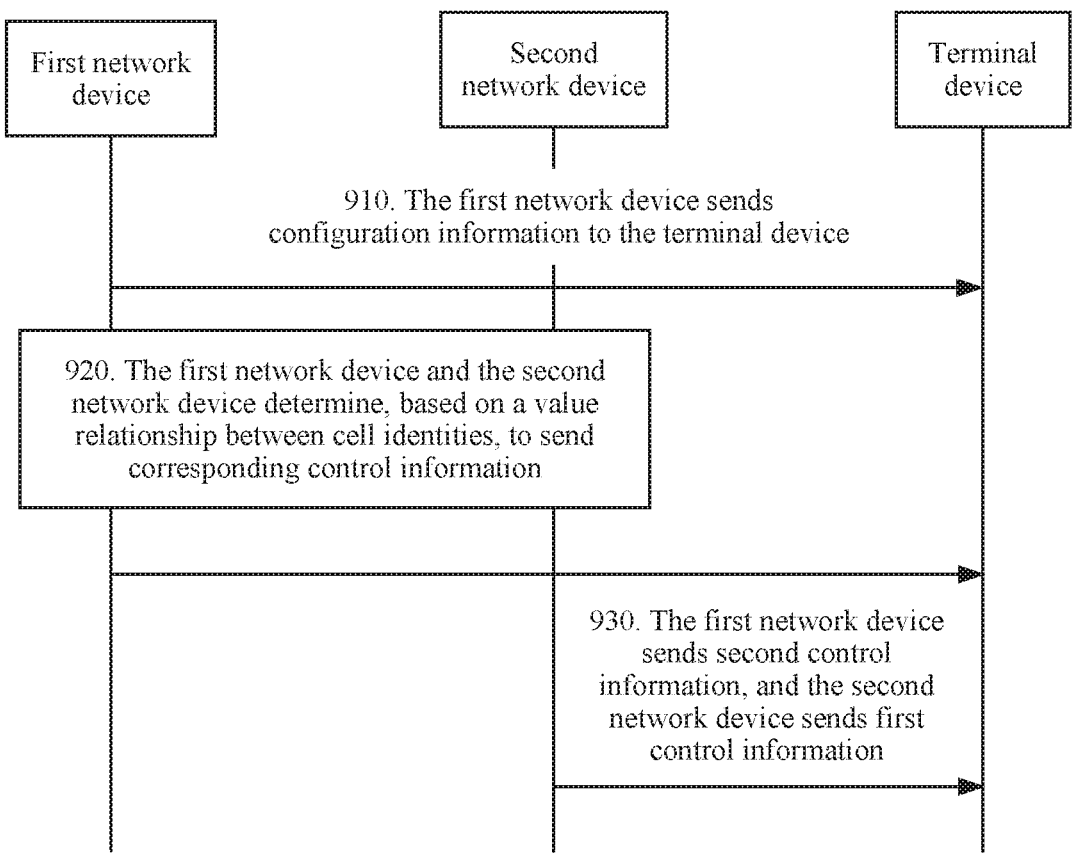
FIG. 9 is a schematic flowchart of a control information transmission method according to another embodiment of this application.

A method shown in FIG. 9 includes the following steps.

910. A first network device sends configuration information to a terminal device.

Specifically, step 910 corresponds to step 210. For specific content in step 910, refer to the corresponding descriptions of step 210. To avoid repetition, details are not described herein again.

920. The first network device and a second network device determine, based on a value relationship between cell identities, to send corresponding control information.

For example, a predefined manner is that same-carrier scheduling is performed for a cell having a larger cell identity and cross-carrier scheduling is performed for a cell having a smaller cell identity. Assuming that a cell identity corresponding to the first network device is greater than a cell identity corresponding to the second network device, the first network device performs same-carrier scheduling for scheduling on a second carrier based on the predefined manner. Therefore, the first network device sends second control information by using the second carrier, the second network device performs cross-carrier scheduling, and the second network device sends first control information by using a first carrier.

A predefined manner is that same-carrier scheduling is performed for a cell having a smaller cell identity and cross-carrier scheduling is performed for a cell having a larger cell identity. Assuming that a cell identity corresponding to the first network device is greater than a cell identity corresponding to the second network device, the second network device performs same-carrier scheduling for scheduling on a second carrier based on the predefined manner. Therefore, the first network device sends second control information by using the second carrier, the first network device performs cross-carrier scheduling, and the second network device sends first control information by using a first carrier.

Alternatively, another predefined manner is used. This is not limited herein.

Further, optionally, a network device sending the configuration information may be the same as or different from a network device sending control information. For example, a device other than the first network device and the second network device sends the configuration information. For example, a third network device sends the configuration information, and the first network device or the second network device sends the control information. This is not specifically limited herein.

930. The first network device sends the second control information, and the second network device sends the first control information.

Correspondingly, the terminal device may also determine, based on the predefined manner, a network device corresponding to each piece of control information, so that the terminal device can perform a corresponding uplink feedback, for example, perform power control, resource determining, or beam determining of uplink transmission.

Certainly, in a variant manner of FIG. 9, the first network device sends the first control information, and the second network device sends the second control information. This manner is similar to the descriptions in FIG. 9. To avoid repetition, details are not described herein again.

During actual transmission, the first network device or the second network device may alternatively not send the control information. That is, even though the configuration information or a preset system configuration is used to instruct the terminal device to detect the first control information and the second control information, the terminal device may actually detect the first control information and the second control information, or the terminal device may detect only the first control information, or the terminal device may detect only the second control information, or the terminal device may detect neither the first control information nor the second control information. This is not specifically limited herein.

Therefore, in this embodiment of this application, the network device sends the configuration information, and for data scheduling on one carrier, the terminal device detects both a cross-carrier scheduling cell and a same-carrier scheduling cell. In this way, a prior-art problem that only control information on the data scheduling carrier is detected is resolved, and a conflict between resources for a plurality of pieces of control information of a same terminal device is avoided, so that the terminal device can accurately obtain control information sent by each transmission point, thereby improving network performance.

It should be understood that FIG. 8 and FIG. 9 separately describes, by using examples, that a carrier used to send control information is determined based on a predefined cell type or a cell identity value. In this embodiment of this application, a carrier used to send control information may be determined in another predefined manner, for example, a specific carrier on which control information is sent is determined based on a size of carrier bandwidth or a size of a control channel resource set of the carrier. This embodiment of this application is not limited thereto.

It should be understood that sequence numbers of the foregoing processes do not mean execution sequences. The execution sequences of the processes should be determined based on functions and internal logic of the processes, and should not be construed as any limitation on the implementation processes of the embodiments of this application.

It should be noted that the examples in the foregoing embodiments are merely used to help a person skilled in the art to understand the embodiments of this application, and the embodiments of this application are not limited to a specific value or a specific scenario in the examples. Apparently, a person skilled in the art can make various equivalent modifications or changes to the foregoing examples. For example, FIG. 6 to FIG. 9 all describe the case in which the first network device sends the configuration information. However, the embodiments of this application are not limited thereto. For example, a network device sending the configuration information may be the second network device, or a network device sending the configuration information may be a device other than the first network device and the second network device. Optionally, in the embodiments of this application, the configuration information may not be sent. In this case, the terminal device does not need an indication from the network device, and for scheduled data on a carrier, the terminal device may detect control information on a plurality of carriers based on a preset system configuration. Optionally, the foregoing embodiments of this application may be integrated or combined with each other, or the like. The various modifications or changes described above also fall within the scope of the embodiments of this application.

The control information transmission methods in the embodiments of this application are described above in detail with reference to FIG. 1 to FIG. 9. Devices in the embodiments of this application are described below in detail with reference to FIG. 10 to FIG. 13.

Figure 10:
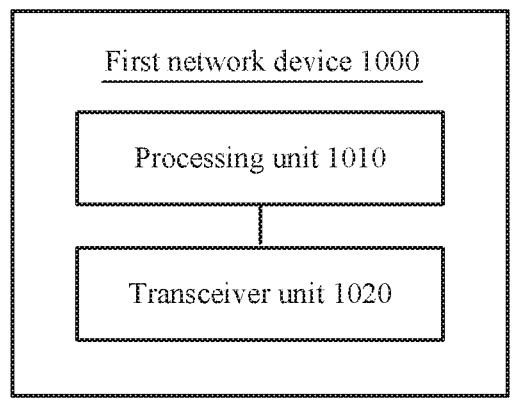
FIG. 10 is a schematic block diagram of a first network device according to an embodiment of this application.

FIG. 10 is a schematic block diagram of a first network device 1000 according to an embodiment of this application.

Specifically, as shown in FIG. 10, the first network device 1000 includes a processing unit 1010 and a transceiver unit 1020.

Specifically, the processing unit is configured to control the transceiver unit to: send configuration information to a terminal device, where the configuration information is used to instruct the terminal device to detect first control information on a first carrier and detect second control information on a second carrier, and both the first control information and the second control information are control information for scheduling data on the second carrier; and send at least one of the first control information and the second control information.

Therefore, in this embodiment of this application, the network device sends the configuration information, and for data scheduling on one carrier, the terminal device detects both a cross-carrier scheduling cell and a same-carrier scheduling cell. In this way, a prior-art problem that only control information on the data scheduling carrier is detected is resolved, and a conflict between resources for a plurality of pieces of control information of a same terminal device is avoided, so that the terminal device can accurately obtain control information sent by each transmission point, thereby improving network performance.

Optionally, in another embodiment, the configuration information includes first identifier information and second identifier information, the first identifier information is used to indicate the first carrier, and the second identifier information is used to indicate the second carrier.

Optionally, in another embodiment, the transceiver unit is specifically configured to determine, based on a traffic volume on the first carrier or the second carrier, to send the first control information on the first carrier; or the transceiver unit is specifically configured to determine, based on a traffic volume on the first carrier or the second carrier, to send the second control information on the second carrier.

Optionally, in another embodiment, the transceiver unit is specifically configured to send the first control information on the first carrier when the traffic volume on the second carrier is greater than a preset traffic volume threshold;

when the transceiver unit determines to send the first control information on the first carrier, the transceiver unit is further configured to:

send first scheduling indication information to the second network device, where the first scheduling indication information is used to instruct the second network device to send the second control information by using the second carrier;

the transceiver unit is specifically configured to send, by the first network device, the second control information on the second carrier when the traffic volume on the first carrier is greater than a preset traffic volume threshold; and when the transceiver unit determines to send the first control information on the first carrier, the transceiver unit is further configured to:

send second scheduling indication information to the second network device, where the second scheduling indication information is used to instruct the second network device to send the first control information by using the first carrier.

Alternatively, in another embodiment, the transceiver unit is specifically configured to determine, according to third scheduling indication information sent by the second network device, to send the first control information on the first carrier, where the third scheduling indication information is used to instruct the transceiver unit to send the first control information by using the first carrier or the third scheduling indication information is used to instruct the second network device to send the second control information by using the second carrier; or the transceiver unit is specifically configured to send the second control information on the second carrier according to fourth scheduling indication information sent by the second network device, where the fourth scheduling indication information is used to instruct the transceiver unit to send the second control information by using the second carrier or the fourth scheduling indication information is used to instruct the second network device to send the first control information by using the first carrier.

Alternatively, in another embodiment, that the first network device sends at least one of the first control information and the second control information includes:

determining, by the first network device based on a cell type of the first network device, to send the first control information on the first carrier or send the second control information on the second carrier, where the cell type is a serving cell or a coordinated cell.

Alternatively, in another embodiment, the transceiver unit is specifically configured to determine, based on a value relationship between a cell identity of the first network device and a cell identity of the second network device, to send the first control information on the first carrier or send the second control information on the second carrier.

Optionally, in another embodiment, the transceiver unit is further configured to send cell indication information to the terminal device, where the cell indication information is used to indicate at least one of the following information: cell identity information separately corresponding to the first control information and the second control information, path loss identifier information separately corresponding to the first control information and the second control information, beam reference signal identifier information separately corresponding to the first control information and the second control information, synchronization signal identifier information separately corresponding to the first control information and the second control information, mobility reference signal identifiers separately corresponding to the first control information and the second control information, and quasi co-location indication information separately corresponding to the first control information and the second control information.

Optionally, in another embodiment, when the transceiver unit sends the first control information on the first carrier, the second control information is sent by the second network device by using the second carrier; or when the transceiver unit sends the second control information on the second carrier, the second control information is sent by the first network device by using the second carrier.

It should be understood that the first network device 1000 shown in FIG. 10 can implement the processes of the first network device in the method embodiments in FIG. 2 to FIG. 9. Operations and/or functions of modules in the first network device 1000 are separately intended to implement corresponding procedures in the method embodiments in FIG. 2 to FIG. 9. For details, refer to the descriptions in the foregoing method embodiments. To avoid repetition, detailed descriptions are properly omitted herein.

It should be understood that, in this embodiment of this application, a second network device is further provided. The second network device is similar to the first network device. For example, the second network device includes a processing unit and a transceiver unit. The second network device can implement the processes of the second network device in the method embodiments in FIG. 2 to FIG. 9. Operations and/or functions of modules in the second network device are separately intended to implement corresponding procedures in the method embodiments in FIG. 2 to FIG. 9. For details, refer to the descriptions in the foregoing method embodiments. It should be noted that functional modules in the second network device are similar to functional modules in the first network device, and a difference lies in that the transceiver unit in the first network device needs to send the configuration information to the terminal device, and the transceiver unit in the second network device does not need to send the configuration information. Other functions of the second network device are similar to those of the first network device. To avoid repetition, details are not described herein again.

Figure 11:
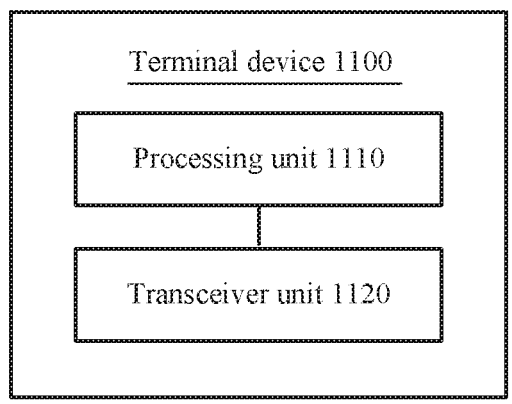
FIG. 11 is a schematic block diagram of a terminal device according to an embodiment of this application.

FIG. 11 is a schematic block diagram of a terminal device 1100 according to an embodiment of this application. Specifically, as shown in FIG. 11, the first network device 1100 includes a processing unit 1110 and a transceiver unit 1120.

Specifically, the processing unit is configured to control the transceiver unit to: receive configuration information sent by a first network device, where the configuration information is used to instruct the terminal device to detect first control information on a first carrier and detect second control information on a second carrier, and both the first control information and the second control information are control information for scheduling data on the second carrier; and detect the first control information on the first carrier, and detect the second control information on the second carrier.

Therefore, in this application, the network device sends the configuration information, and for data scheduling on one carrier, the terminal device detects both a cross-carrier scheduling cell and a same-carrier scheduling cell. In this way, a prior-art problem that only control information on the data scheduling carrier is detected is resolved, and a conflict between resources for a plurality of pieces of control information of a same terminal device is avoided, so that the terminal device can accurately obtain control information sent by each transmission point, thereby improving network performance.

Optionally, in another embodiment, the configuration information includes first identifier information and second identifier information, the first identifier information is used to indicate the first carrier, and the second identifier information is used to indicate the second carrier.

Optionally, in another embodiment, the processing unit is further configured to determine a correspondence between a network device and control information, where the correspondence includes that the first network device corresponds to the first control information carried on the first carrier, and that the second network device corresponds to the second control information carried on the second carrier; or the correspondence includes that the first network device corresponds to the second control information carried on the second carrier, and that the second network device corresponds to the first control information carried on the first carrier.

Optionally, in another embodiment, the processing unit is specifically configured to determine the correspondence based on a cell type of the first network device and a cell type of the second network device, where the cell type includes a serving cell or a coordinated cell.

Alternatively, in another embodiment, the processing unit is specifically configured to determine the correspondence based on a value relationship between a cell identity of the first network device and a cell identity of the second network device.

Alternatively, in another embodiment, the transceiver unit is further configured to:

obtain cell indication information sent by the network device, where the cell indication information is used to indicate at least one of the following information: cell identity information separately corresponding to the first control information and the second control information, path loss identifier information separately corresponding to the first control information and the second control information, beam reference signal identifier information separately corresponding to the first control information and the second control information, synchronization signal identifier information separately corresponding to the first control information and the second control information, mobility reference signal identifiers separately corresponding to the first control information and the second control information, and quasi co-location indication information separately corresponding to the first control information and the second control information; and that the terminal device determines a correspondence between a network device and control information includes:

determining, by the terminal device, the correspondence according to the cell indication information.

Optionally, in another embodiment, the first control information is sent by the first network device by using the first carrier, and the second control information is sent by the second network device by using the second carrier; or the first control information is sent by the second network device by using the first carrier, and the second control information is sent by the first network device by using the second carrier.

It should be understood that the terminal device 1100 shown in FIG. 11 can implement the processes of the terminal device in the method embodiments in FIG. 2 to FIG. 9. Operations and/or functions of modules in the terminal device 1100 are separately intended to implement corresponding procedures in the method embodiments in FIG. 2 to FIG. 9. For details, refer to the descriptions in the foregoing method embodiments. To avoid repetition, detailed descriptions are properly omitted herein.

Figure 12:
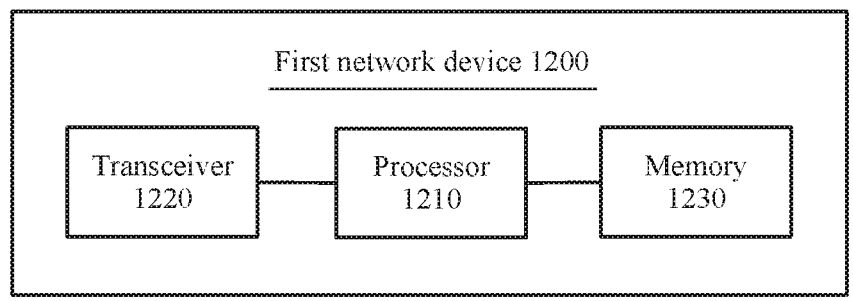
FIG. 12 is a schematic block diagram of a first network device according to another embodiment of this application.

FIG. 12 is a schematic block diagram of a first network device 1200 according to an embodiment of this application. Specifically, as shown in FIG. 12, the first network device 1200 includes a processor 1210 and a transceiver 1220. The processor 1210 is connected to the transceiver 1220. Optionally, the network device 1200 further includes a memory 1230. The memory 1230 is connected to the processor 1210. The processor 1210, the memory 1230, and the transceiver 1220 communicate with each other by using an internal connection path, to transmit a control signal and/or a data signal. The memory 1230 may be configured to store an instruction. The processor 1210 is configured to: execute the instruction stored in the memory 1230 and control the transceiver 1220 to receive and send information or a signal. The controller 1210 executes the instruction in the memory 1230, so that the processes of the first network device in the method embodiments in FIG. 2 to FIG. 9 can be completed. To avoid repetition, details are not described herein again.

It should be understood that the first network device 1200 may correspond to the first network device 1000 in FIG. 10, the function of the processing unit 1010 in the first network device 1000 may be implemented by the processor 1210, and the function of the transceiver unit 1020 may be implemented by the transceiver 1220.

Therefore, in this embodiment of this application, the network device sends configuration information, and for data scheduling on one carrier, a terminal device detects both a cross-carrier scheduling cell and a same-carrier scheduling cell. In this way, a prior-art problem that only control information on the data scheduling carrier is detected is resolved, and a conflict between resources for a plurality of pieces of control information of a same terminal device is avoided, so that the terminal device can accurately obtain control information sent by each transmission point, thereby improving network performance.

It should be understood that, in this embodiment of this application, a second network device is further provided. The second network device is similar to the first network device. For example, the second network device may include a processor and a transceiver. Optionally, the second network device may further include a memory. The second network device can implement the processes of the second network device in the method embodiments in FIG. 2 to FIG. 9. Operations and/or functions of modules in the second network device are separately intended to implement corresponding procedures in the method embodiments in FIG. 2 to FIG. 9. For details, refer to the descriptions in the foregoing method embodiments. It should be noted that functional modules in the second network device are similar to functional modules in the first network device, and a difference lies in that the transceiver in the first network device needs to send the configuration information to the terminal device, and the transceiver in the second network device does not need to send the configuration information. Other functions of the second network device are similar to those of the first network device. To avoid repetition, details are not described herein again.

Figure 13:
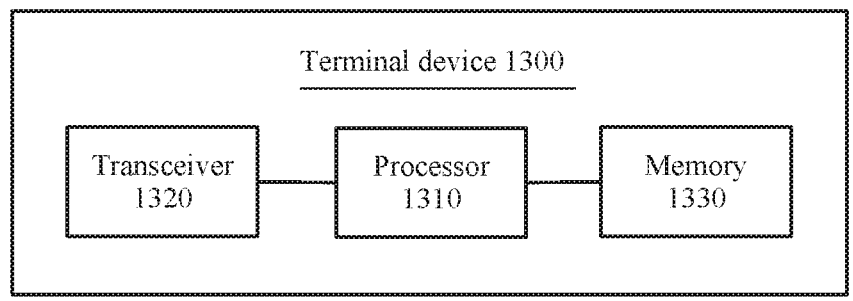
FIG. 13 is a schematic block diagram of a terminal device according to another embodiment of this application.

FIG. 13 is a schematic block diagram of a terminal device 1300 according to an embodiment of this application. Specifically, as shown in FIG. 13, the terminal device 1300 includes a processor 1310 and a transceiver 1320. The processor 1310 is connected to the transceiver 1320. Optionally, the terminal device 1300 further includes a memory 1330. The memory 1330 is connected to the processor 1310. The processor 1310, the memory 1330, and the transceiver 1320 communicate with each other by using an internal connection path, to transmit a control signal and/or a data signal. The memory 1330 may be configured to store an instruction. The processor 1310 is configured to: execute the instruction stored in the memory 1330 and control the transceiver 1320 to receive and send information or a signal. The controller 1310 executes the instruction in the memory 1330, so that the processes of the terminal device in the method embodiments in FIG. 2 to FIG. 9 can be completed. To avoid repetition, details are not described herein again.

It should be understood that the terminal device 1300 may correspond to the terminal device 1100 in FIG. 11, the function of the processing unit 1110 in the terminal device 1100 may be implemented by the processor 1310, and the function of the transceiver unit 1120 may be implemented by the transceiver 1320.

Therefore, in this embodiment of this application, a network device sends configuration information, and for data scheduling on one carrier, the terminal device detects both a cross-carrier scheduling cell and a same-carrier scheduling cell. In this way, a prior-art problem that only control information on the data scheduling carrier is detected is resolved, and a conflict between resources for a plurality of pieces of control information of a same terminal device is avoided, so that the terminal device can accurately obtain control information sent by each transmission point, thereby improving network performance.

It should be noted that the processor (such as the processor 1210 in FIG. 12 or the processor 1310 in FIG. 13) in the embodiments of this application may be an integrated circuit chip, and has a signal processing capability. In an implementation process, steps in the foregoing method embodiment may be completed by using an integrated logic circuit of hardware in the processor or an instruction in a form of software. The processor may be a general purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a discrete gate or a transistor logic device, or a discrete hardware component, and may implement or perform the disclosed methods, steps, and logical block diagrams in the embodiments of this application. The general purpose processor may be a microprocessor, or the processor may be any conventional processor or the like. The steps of the method disclosed in the embodiments of this application may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically-erasable programmable memory, or a register. The storage medium is located in the memory, and the processor reads information in the memory and implements the steps of the foregoing method in combination with hardware in the processor.

It may be understood that the memory (such as the memory 1230 in FIG. 12 or the memory 1330 in FIG. 13) in the embodiments of this application may be a volatile memory or a non-volatile memory, or may include both a volatile memory and a non-volatile memory. The nonvolatile memory may be a read-only memory (Read-Only Memory, ROM), a programmable read-only memory (Programmable ROM, PROM), an erasable programmable read only memory (Erasable PROM, EPROM), an electrically erasable programmable read-only memory (Electrically EPROM, EEPROM), or a flash memory. The volatile memory may be a random access memory (Random Access Memory, RAM) and is used as an external cache. Through example but not limitative description, many forms of RAMS may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory in the system and the method described in this specification includes but is not limited to these memories and any other proper type of memory.

An embodiment of this application further provides a computer readable medium. The computer readable medium stores a computer program. When the computer program is executed by a computer, the control information transmission method in any one of the foregoing method embodiments is implemented.

An embodiment of this application further provides a computer program product. When the computer program product is executed by a computer, the control information transmission method in any one of the foregoing method embodiments is implemented.

All or some of the foregoing embodiments may be implemented by using software, hardware, firmware, or any combination thereof. When software is used to implement the embodiments, the embodiments may be implemented all or partially in a form of a computer program product. The computer program product includes one or more computer instructions. When the computer instructions are loaded and executed on a computer, the procedures or functions in the embodiments of this application are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DR.)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (Digital Video Disc, DVD), a semiconductor medium (for example, a solid state disk (Solid State Disk, SSD)), or the like.

An embodiment of this application further provides a processing apparatus, including a processor and an interface. The processor is configured to perform a carrier measurement method in any one of the method embodiments.

It should be understood that the processing apparatus may be a chip, and the processor may be implemented by using hardware or software. When the processor is implemented by using hardware, the processor may be a logic circuit, an integrated circuit, or the like. When the processor is implemented by using software, the processor may be a general purpose processor, and is implemented by reading software code stored in a memory. The memory may be integrated into the processor, or may be located outside the processor and exist independently.

An embodiment of this application further provides a communications system. The communications system includes the first network device in the foregoing embodiment and the second network device in the foregoing embodiment. The communications system may further include the terminal device in the foregoing embodiment. In the communications system, joint transmission is implemented between the terminal device and the first network device and between the terminal device and the second network device. For example, the communications system may be the communications system shown in FIG. 1. For functions of the devices in the communications system, refer to the related descriptions in any one of the foregoing embodiments. Details are not described herein again.

It should be understood that "an embodiment" or "one embodiment" mentioned in the entire specification means that particular features, structures, or characteristics related to the embodiment are included in at least one embodiment of this application. Therefore, "in an embodiment" or "in one embodiment" appearing throughout the entire specification does not necessarily refer to a same embodiment. In addition, these particular features, structures, or characteristics may be combined in one or more embodiments in any proper manner. It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should be further understood that determining A according to B does not mean that B is determined according to only A, and B may be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

With descriptions of the foregoing implementations, a person skilled in the art may clearly understand that this application may be implemented by hardware, firmware or a combination thereof. When the present invention is implemented by software, the foregoing functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any available medium accessible to a computer. The following provides an example but does not impose a limitation: The computer readable medium may include a RAM, a ROM, an EEPROM, a CD-ROM, or another optical disc storage or a disk storage medium, or another magnetic storage device, or any other medium that can carry or store expected program code in a form of an instruction or a data structure and can be accessed by a computer. In addition, any connection may be properly defined as a computer readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. A disk (Disk) and a disc (disc) used in this application includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer readable medium.

In conclusion, the foregoing descriptions are merely example embodiments of the technical solutions in this application, but are not intended to limit the protection scope of this application. Any modification, equivalent replacement, or improvement made without departing from the spirit and principle of this application shall fall within the protection scope of this application.

What is claimed is:

1. A control information transmission method, comprising:
   sending, by a first network device, configuration information to a terminal device, wherein the configuration information instructs the terminal device to detect first control information on a first carrier and detect second control information on a second carrier that is different from the first carrier, and both the first control information and the second control information are control information for scheduling data on the second carrier; and
   sending, by the first network device, at least one of the first control information and the second control information, wherein the sending, by the first network device, at least one of the first control information and the second control information comprises:
   if the first network device determines to send the first control information on the first carrier, sending, by the first network device, first scheduling indication information to a second network device, wherein the first scheduling indication information instructs the second network device to send the second control information by using the second carrier; or
   if the first network device determines to send the second control information on the second carrier, sending, by the first network device, second scheduling indication information to the second network device, wherein the second scheduling indication information instructs the second network device to send the first control information by using the first carrier.

2. The method according to claim 1, wherein
the configuration information comprises first identifier information and second identifier information, the first identifier information indicates the first carrier, and the second identifier information indicates the second carrier.

3. The method according to claim 1, wherein
the sending, by the first network device, at least one of the first control information and the second control information comprises:
determining, by the first network device based on a traffic volume on the first carrier or the second carrier, to send the first control information on the first carrier; or
determining, by the first network device based on a traffic volume on the first carrier or the second carrier, to send the second control information on the second carrier.

4. The method according to claim 3, wherein:
the determining, by the first network device based on a traffic volume on the first carrier or the second carrier, to send the first control information on the first carrier comprises:
sending, by the first network device, the first control information on the first carrier if a traffic volume of the first network device on the second carrier is greater than a preset traffic volume threshold; or
the determining, by the first network device based on a traffic volume on the first carrier or the second carrier, to send the second control information on the second carrier comprises:
sending, by the first network device, the second control information on the second carrier if a traffic volume of the first network device on the first carrier is greater than a preset traffic volume threshold.

5. The method according to claim 1, wherein
the sending, by the first network device, at least one of the first control information and the second control information comprises:
determining, by the first network device according to third scheduling indication information sent by the second network device, to send the first control information on the first carrier, wherein the third scheduling indication information instructs the first network device to send the first control information by using the first carrier or the third scheduling indication information instructs the second network device to send the second control information by using the second carrier; or
sending, by the first network device, the second control information on the second carrier according to fourth scheduling indication information sent by the second network device, wherein the fourth scheduling indication information instructs the first network device to send the second control information by using the second carrier or the fourth scheduling indication information instructs the second network device to send the first control information by using the first carrier.

6. The method according to claim 1, wherein the sending, by the first network device, at least one of the first control information and the second control information comprises:

determining, by the first network device based on a cell type of the first network device, to send the first control information on the first carrier or send the second control information on the second carrier, wherein the cell type is a serving cell or a coordinated cell.

7. The method according to claim 1, wherein the sending, by the first network device, at least one of the first control information and the second control information comprises:

determining, by the first network device based on a value relationship between a cell identity of the first network device and a cell identity of the second network device, to send the first control information on the first carrier or send the second control information on the second carrier.

8. A first network device, comprising:
a transceiver; and
at least one processor coupled to a non-transitory computer-readable storage medium storing programming instructions for execution by the at least one processor, wherein the programming instructions control the transceiver to:
send configuration information to a terminal device, wherein the configuration information instructs the terminal device to detect first control information on a first carrier and detect second control information on a second carrier that is different from the first carrier, and both the first control information and the second control information are control information for scheduling data on the second carrier; and
send at least one of the first control information and the second control information, wherein:
    if the at least one processor determines to send the first control information on the first carrier, the programming instructions instruct the transceiver to send first scheduling indication information to a second network device, wherein the first scheduling indication information instructs the second network device to send the second control information by using the second carrier; or
    if the at least one processor determines to send the second control information on the second carrier, the programming instructions instruct the transceiver to send second scheduling indication information to the second network device, wherein the second scheduling indication information instructs the second network device to send the first control information by using the first carrier.

9. The first network device according to claim 8, wherein the configuration information comprises first identifier information and second identifier information, the first identifier information indicates the first carrier, and the second identifier information indicates the second carrier.

10. The first network device according to claim 8, wherein the programming instructions instruct the at least one processor to:

determine, based on a traffic volume on the first carrier or the second carrier, to send the first control information on the first carrier; or
determine, based on a traffic volume on the first carrier or the second carrier, to send the second control information on the second carrier.

11. The first network device according to claim 10, wherein the programming instructions instruct the transceiver to:
send the first control information on the first carrier if the traffic volume on the second carrier is greater than a preset traffic volume threshold; or
send the second control information on the second carrier if the traffic volume on the first carrier is greater than a preset traffic volume threshold.

12. The first network device according to claim 8, wherein the programming instructions instruct the at least one processor to determine, according to third scheduling indication information sent by the second network device, to send the first control information on the first carrier, wherein the third scheduling indication information instructs the transceiver to send the first control information by using the first carrier or the third scheduling indication information instructs the second network device to send the second control information by using the second carrier; or
the programming instructions instruct the transceiver to send the second control information on the second carrier according to fourth scheduling indication information sent by the second network device, wherein the fourth scheduling indication information instructs the transceiver to send the second control information by using the second carrier or the fourth scheduling indication information instructs the second network device to send the first control information by using the first carrier.

13. The first network device according to claim 8, wherein the programming instructions instruct the at least one processor to determine, based on a cell type of the first network device, to send the first control information on the first carrier or send the second control information on the second carrier, wherein the cell type is a serving cell or a coordinated cell.

14. The first network device according to claim 8, wherein the programming instructions instruct the at least one processor to determine, based on a value relationship between a cell identity of the first network device and a cell identity of the second network device, to send the first control information on the first carrier or send the second control information on the second carrier.

15. A terminal device, comprising:
a transceiver; and
at least one processor coupled to a non-transitory computer-readable storage medium storing programming instructions for execution by the at least one processor, wherein the programming instructions control the transceiver to:
receive configuration information sent by a first network device, wherein the configuration information instructs the terminal device to detect first control information on a first carrier and detect second control information on a second carrier that is different from the first carrier, and both the first control information and the second control information are control information for scheduling data on the second carrier; and
detect the first control information on the first carrier, and detect the second control information on the second carrier, wherein:

the first control information is sent by the first network device on the first carrier, and the second control information is sent by a second network device by using the second carrier; or the second control information is sent by the first network device on the second carrier, and the first control information is sent by the second network device by using the first carrier.

16. The terminal device according to claim 15, wherein the configuration information comprises first identifier information and second identifier information, the first identifier information indicates the first carrier, and the second identifier information indicates the second carrier.

17. The terminal device according to claim 15, wherein the programming instructions instruct the at least one processor to determine a correspondence between a network device and control information, wherein the correspondence comprises that the first network device corresponds to the first control information carried on the first carrier, and that the second network device corresponds to the second control information carried on the second carrier; or the correspondence comprises that the first network device corresponds to the second control information carried on the second carrier, and that the second network device corresponds to the first control information carried on the first carrier.

18. The terminal device according to claim 17, wherein the programming instructions instruct the at least one processor to determine the correspondence based on a cell type of the first network device and a cell type of the second network device, wherein the cell type comprises a serving cell or a coordinated cell.

19. The terminal device according to claim 17, wherein the programming instructions instruct the at least one processor to determine the correspondence based on a value relationship between a cell identity of the first network device and a cell identity of the second network device.

20. The terminal device according to claim 17, wherein the programming instructions instruct the transceiver to:

obtain cell indication information sent by the network device, wherein the cell indication information indicates at least one of the following information: cell identity information separately corresponding to the first control information and the second control information, path loss identifier information separately corresponding to the first control information and the second control information, beam reference signal identifier information separately corresponding to the first control information and the second control information, synchronization signal identifier information separately corresponding to the first control information and the second control information, mobility reference signal identifiers separately corresponding to the first control information and the second control information, and quasi co-location indication information separately corresponding to the first control information and the second control information; and the programming instructions instruct the at least one processor to determine the correspondence according to the cell indication information.

* * * * *